US010268811B2

(12) United States Patent
Baghdasaryan

(10) Patent No.: US 10,268,811 B2
(45) Date of Patent: Apr. 23, 2019

(54) SYSTEM AND METHOD FOR DELEGATING TRUST TO A NEW AUTHENTICATOR

(71) Applicant: NOK NOK LABS, INC., Palo Alto, CA (US)

(72) Inventor: Davit Baghdasaryan, San Francisco, CA (US)

(73) Assignee: NOK NOK LABS, INC., Palo Alto, CA (US)

( * ) Notice: Subject to any disclaimer, the term of this patent is extended or adjusted under 35 U.S.C. 154(b) by 111 days.

(21) Appl. No.: 14/218,692

(22) Filed: Mar. 18, 2014

(65) Prior Publication Data

US 2014/0289509 A1 Sep. 25, 2014

Related U.S. Application Data

(60) Provisional application No. 61/804,568, filed on Mar. 22, 2013.

(51) Int. Cl.

| | |
|---|---|
| ***G06F 21/32*** | (2013.01) |
| ***G06Q 20/40*** | (2012.01) |

(Continued)

(52) U.S. Cl.

CPC ............ *G06F 21/32* (2013.01); *G06F 21/577* (2013.01); *G06Q 20/204* (2013.01); *G06Q 20/3224* (2013.01); *G06Q 20/3274* (2013.01); *G06Q 20/3278* (2013.01); *G06Q 20/4012* (2013.01); *G06Q 20/40145* (2013.01);

(Continued)

(58) Field of Classification Search

CPC ..... G06F 21/32; G06F 21/577; H04L 9/3231; H04L 63/0492; H04L 63/0861; H04L 63/20; H04L 9/3297; H04L 9/0841; H04L 9/0822; H04L 63/083; H04L 9/3247; H04L 63/08; G06Q 20/425; G06Q 20/3274;

(Continued)

(56) References Cited

U.S. PATENT DOCUMENTS

| | | | |
|---|---|---|---|
| 5,280,527 | A | 1/1994 | Gullman et al. |
| 5,764,789 | A | 6/1998 | Pare, Jr. et al. |

(Continued)

FOREIGN PATENT DOCUMENTS

| | | | |
|---|---|---|---|
| CN | 1705925 | A | 12/2005 |
| CN | 101394283 | A | 3/2009 |

(Continued)

OTHER PUBLICATIONS

Transmittal of International Preliminary Report on Patentability from foreign counterpart PCT/US2013/077888, dated Jul. 9, 2015, 7 pages.

(Continued)

*Primary Examiner* — Jeffrey D. Popham
(74) *Attorney, Agent, or Firm* — Nicholson De Vos Webster & Elliott LLP

(57) ABSTRACT

A system, apparatus, method, and machine readable medium are described for delegating trust to a new client device or a new authenticator on a trusted device. For example, one embodiment of a method comprises: implementing a series of trust delegation operations to transfer registration data associated with one or more trusted authenticators on a trusted client device to one or more new authenticators on a new client device or on the trusted client device.

20 Claims, 13 Drawing Sheets

(51) Int. Cl.

| | |
|---|---|
| ***G06Q 20/42*** | (2012.01) |
| ***H04L 9/32*** | (2006.01) |
| ***H04L 29/06*** | (2006.01) |
| ***H04L 9/08*** | (2006.01) |
| ***G06F 21/57*** | (2013.01) |
| ***G07F 19/00*** | (2006.01) |
| ***G06Q 20/20*** | (2012.01) |
| ***G06Q 20/32*** | (2012.01) |
| *H04W 12/06* | (2009.01) |

(52) U.S. Cl.

CPC ........... *G06Q 20/42* (2013.01); *G06Q 20/425* (2013.01); *G07F 19/20* (2013.01); *H04L 9/0819* (2013.01); *H04L 9/0822* (2013.01); *H04L 9/0841* (2013.01); *H04L 9/3231* (2013.01); *H04L 9/3247* (2013.01); *H04L 9/3297* (2013.01); *H04L 63/0492* (2013.01); *H04L 63/08* (2013.01); *H04L 63/083* (2013.01); *H04L 63/0861* (2013.01); *H04L 63/20* (2013.01); *G06F 2221/2115* (2013.01); *H04L 2209/805* (2013.01); *H04L 2463/102* (2013.01); *H04W 12/06* (2013.01)

(58) Field of Classification Search

CPC ............. G06Q 20/3278; G06Q 20/204; G06Q 20/3224; G06Q 20/4012; G06Q 20/42; G07F 19/20

See application file for complete search history.

(56) References Cited

U.S. PATENT DOCUMENTS

| | | | |
|---|---|---|---|
| 6,035,406 | A | 3/2000 | Moussa et al. |
| 6,088,450 | A | 7/2000 | Davis et al. |
| 6,178,511 | B1 | 1/2001 | Cohen et al. |
| 6,270,011 | B1 | 8/2001 | Gottfried |
| 6,377,691 | B1 | 4/2002 | Swift et al. |
| 6,510,236 | B1 | 1/2003 | Crane et al. |
| 6,618,806 | B1 | 9/2003 | Brown et al. |
| 6,751,733 | B1 | 6/2004 | Nakamura et al. |
| 6,842,896 | B1 | 1/2005 | Redding et al. |
| 6,938,156 | B2 | 8/2005 | Wheeler et al. |
| 7,155,035 | B2 | 12/2006 | Kondo et al. |
| 7,194,761 | B1 | 3/2007 | Champagne |
| 7,194,763 | B2 | 3/2007 | Potter et al. |
| 7,263,717 | B1 | 8/2007 | Boydstun et al. |
| 7,444,368 | B1 | 10/2008 | Wong et al. |
| 7,487,357 | B2 | 2/2009 | Smith et al. |
| 7,512,567 | B2 | 3/2009 | Bemmel et al. |
| 7,698,565 | B1 | 4/2010 | Bjorn et al. |
| 7,865,937 | B1 | 1/2011 | White |
| 7,941,669 | B2 | 5/2011 | Foley et al. |
| 8,060,922 | B2 | 11/2011 | Crichton et al. |
| 8,166,531 | B2 | 4/2012 | Suzuki |
| 8,245,030 | B2 | 8/2012 | Lin |
| 8,284,043 | B2 | 10/2012 | Judd et al. |
| 8,291,468 | B1 | 10/2012 | Chickering |
| 8,353,016 | B1 | 1/2013 | Pravetz et al. |
| 8,359,045 | B1 | 1/2013 | Hopkins, III |
| 8,412,928 | B1 | 4/2013 | Bowness |
| 8,458,465 | B1 | 6/2013 | Stern et al. |
| 8,489,506 | B2 | 7/2013 | Hammad et al. |
| 8,516,552 | B2 | 8/2013 | Raleigh |
| 8,555,340 | B2 | 10/2013 | Potter et al. |
| 8,561,152 | B2 | 10/2013 | Novak et al. |
| 8,584,219 | B1 | 11/2013 | Toole et al. |
| 8,584,224 | B1 | 11/2013 | Pei et al. |
| 8,607,048 | B2 | 12/2013 | Nogawa |
| 8,646,060 | B1 | 2/2014 | Ben Ayed |
| 8,713,325 | B2 | 4/2014 | Ganesan |
| 8,719,905 | B2 | 5/2014 | Ganesan |
| 8,776,180 | B2 | 7/2014 | Kumar et al. |
| 8,843,997 | B1 | 9/2014 | Hare |
| 8,856,541 | B1 | 10/2014 | Chaudhury et al. |
| 8,949,978 | B1 | 2/2015 | Lin |
| 8,958,599 | B1 | 2/2015 | Starner |
| 8,978,117 | B2 | 3/2015 | Bentley et al. |
| 9,015,482 | B2 | 4/2015 | Baghdasaryan et al. |
| 9,032,485 | B2 | 5/2015 | Chu et al. |
| 9,083,689 | B2 | 7/2015 | Lindemann et al. |
| 9,161,209 | B1 | 10/2015 | Ghoshal et al. |
| 9,171,306 | B1 | 10/2015 | He et al. |
| 9,172,687 | B2 | 10/2015 | Baghdasaryan et al. |
| 9,219,732 | B2 | 12/2015 | Baghdasaryan et al. |
| 9,306,754 | B2 | 4/2016 | Baghdasaryan et al. |
| 9,367,678 | B2 | 6/2016 | Pal et al. |
| 9,396,320 | B2 | 7/2016 | Lindemann |
| 2001/0037451 | A1 | 11/2001 | Bhagavatula et al. |
| 2002/0010857 | A1 | 1/2002 | Karthik |
| 2002/0016913 | A1 | 2/2002 | Wheeler et al. |
| 2002/0040344 | A1 | 4/2002 | Preiser et al. |
| 2002/0073316 | A1 | 6/2002 | Collins et al. |
| 2002/0073320 | A1 | 6/2002 | Rinkevich et al. |
| 2002/0087894 | A1 | 7/2002 | Foley et al. |
| 2002/0112170 | A1 | 8/2002 | Foley et al. |
| 2002/0174344 | A1 | 11/2002 | Ting |
| 2002/0174348 | A1 | 11/2002 | Ting |
| 2002/0190124 | A1 | 12/2002 | Piotrowski |
| 2003/0021283 | A1 | 1/2003 | See et al. |
| 2003/0055792 | A1 | 3/2003 | Kinoshita et al. |
| 2003/0065805 | A1 | 4/2003 | Barnes et al. |
| 2003/0084300 | A1 | 5/2003 | Koike |
| 2003/0087629 | A1 | 5/2003 | Juitt |
| 2003/0115142 | A1 | 6/2003 | Brickell et al. |
| 2003/0135740 | A1 | 7/2003 | Talmor et al. |
| 2003/0152252 | A1 | 8/2003 | Kondo |
| 2003/0226036 | A1 | 12/2003 | Bivens et al. |
| 2003/0236991 | A1 | 12/2003 | Letsinger |
| 2004/0039909 | A1 | 2/2004 | Cheng |
| 2004/0101170 | A1 | 5/2004 | Tisse et al. |
| 2004/0123153 | A1 | 6/2004 | Wright et al. |
| 2005/0021964 | A1 | 1/2005 | Bhatnagar et al. |
| 2005/0080716 | A1 | 4/2005 | Belyi et al. |
| 2005/0097320 | A1 | 5/2005 | Golan et al. |
| 2005/0100166 | A1 | 5/2005 | Smetters et al. |
| 2005/0125295 | A1 | 6/2005 | Tidwell et al. |
| 2005/0160052 | A1 | 7/2005 | Schneider et al. |
| 2005/0187883 | A1 | 8/2005 | Bishop et al. |
| 2005/0223217 | A1 | 10/2005 | Howard et al. |
| 2005/0223236 | A1 | 10/2005 | Yamada et al. |
| 2005/0278253 | A1 | 12/2005 | Meek et al. |
| 2006/0026671 | A1 | 2/2006 | Potter et al. |
| 2006/0029062 | A1 | 2/2006 | Rao |
| 2006/0101136 | A1 | 5/2006 | Akashika et al. |
| 2006/0156385 | A1 | 7/2006 | Chiviendacz et al. |
| 2006/0161435 | A1 | 7/2006 | Atef et al. |
| 2006/0161672 | A1 | 7/2006 | Jolley et al. |
| 2006/0282670 | A1 | 12/2006 | Karchov |
| 2007/0005988 | A1 | 1/2007 | Zhang et al. |
| 2007/0077915 | A1 | 4/2007 | Black et al. |
| 2007/0088950 | A1 | 4/2007 | Wheeler |
| 2007/0094165 | A1 | 4/2007 | Gyorfi et al. |
| 2007/0100756 | A1 | 5/2007 | Varma |
| 2007/0106895 | A1 | 5/2007 | Huang et al. |
| 2007/0107048 | A1 | 5/2007 | Halls et al. |
| 2007/0118883 | A1 | 5/2007 | Potter et al. |
| 2007/0165625 | A1 | 7/2007 | Eisner et al. |
| 2007/0168677 | A1 | 7/2007 | Kudo et al. |
| 2007/0169182 | A1 | 7/2007 | Wolfond et al. |
| 2007/0198435 | A1 | 8/2007 | Siegal et al. |
| 2007/0234417 | A1 | 10/2007 | Blakley, III et al. |
| 2007/0239980 | A1 | 10/2007 | Funayama |
| 2007/0278291 | A1 | 12/2007 | Rans et al. |
| 2007/0286130 | A1 | 12/2007 | Shao et al. |
| 2008/0005562 | A1 | 1/2008 | Sather et al. |
| 2008/0025234 | A1 | 1/2008 | Zhu |
| 2008/0028453 | A1 | 1/2008 | Nguyen et al. |
| 2008/0034207 | A1 | 2/2008 | Cam-Winget et al. |
| 2008/0046334 | A1 | 2/2008 | Lee et al. |
| 2008/0046984 | A1 | 2/2008 | Bohmer et al. |
| 2008/0049983 | A1 | 2/2008 | Miller et al. |
| 2008/0072054 | A1 | 3/2008 | Choi |

(56) References Cited

U.S. PATENT DOCUMENTS

2008/0086759 A1 4/2008 Colson
2008/0134311 A1 6/2008 Medvinsky
2008/0141339 A1 6/2008 Gomez et al.
2008/0172725 A1 7/2008 Fujii et al.
2008/0184351 A1 7/2008 Gephart et al.
2008/0209545 A1 8/2008 Asano
2008/0232565 A1 9/2008 Kutt et al.
2008/0235801 A1 9/2008 Soderberg et al.
2008/0271150 A1 10/2008 Boerger et al.
2008/0289019 A1 11/2008 Lam
2008/0289020 A1 11/2008 Cameron et al.
2008/0313719 A1 12/2008 Kaliski, Jr. et al.
2008/0320308 A1 12/2008 Kostiainen et al.
2009/0049510 A1 2/2009 Zhang et al.
2009/0064292 A1 3/2009 Carter et al.
2009/0089870 A1 4/2009 Wahl
2009/0100269 A1 4/2009 Naccache
2009/0116651 A1 5/2009 Liang et al.
2009/0119221 A1 5/2009 Weston et al.
2009/0133113 A1 5/2009 Schneider
2009/0138724 A1 5/2009 Chiou et al.
2009/0138727 A1 5/2009 Campello
2009/0158425 A1 6/2009 Chan
2009/0183003 A1 7/2009 Haverinen
2009/0187988 A1 7/2009 Hulten et al.
2009/0193508 A1 7/2009 Brenneman
2009/0196418 A1 8/2009 Tkacik et al.
2009/0199264 A1 8/2009 Lang
2009/0204964 A1 8/2009 Foley
2009/0235339 A1 9/2009 Mennes et al.
2009/0271618 A1 10/2009 Camenisch et al.
2009/0271635 A1 10/2009 Liu et al.
2009/0300714 A1 12/2009 Ahn
2009/0300720 A1 12/2009 Guo et al.
2009/0307139 A1 12/2009 Mardikar et al.
2009/0327131 A1 12/2009 Beenau et al.
2009/0328197 A1 12/2009 Newell
2010/0010932 A1 1/2010 Law et al.
2010/0023454 A1 1/2010 Exton et al.
2010/0029300 A1 2/2010 Chen
2010/0042848 A1 2/2010 Rosener
2010/0062744 A1 3/2010 Ibrahim
2010/0070424 A1 3/2010 Monk
2010/0082484 A1 4/2010 Erhart et al.
2010/0083000 A1 4/2010 Kesanupalli
2010/0094681 A1 4/2010 Almen et al.
2010/0105427 A1 4/2010 Gupta
2010/0107222 A1 4/2010 Glasser
2010/0114776 A1 5/2010 Weller et al.
2010/0169650 A1 7/2010 Brickell et al.
2010/0175116 A1 7/2010 Gum
2010/0186072 A1 7/2010 Kumar
2010/0191612 A1 7/2010 Raleigh
2010/0192209 A1 7/2010 Steeves et al.
2010/0205658 A1 8/2010 Griffin
2010/0223663 A1 9/2010 Morimoto et al.
2010/0242088 A1 9/2010 Thomas
2010/0266128 A1 10/2010 Asokan et al.
2010/0287369 A1 11/2010 Monden
2010/0299738 A1 11/2010 Wahl
2010/0325427 A1* 12/2010 Ekberg .................... H04L 9/321 713/156
2010/0325664 A1 12/2010 Kang
2010/0325684 A1 12/2010 Grebenik
2010/0325711 A1 12/2010 Etchegoyen
2011/0004918 A1 1/2011 Chow et al.
2011/0004933 A1 1/2011 Dickinson et al.
2011/0022835 A1 1/2011 Schibuk
2011/0047608 A1 2/2011 Levenberg
2011/0071841 A1 3/2011 Fomenko et al.
2011/0078443 A1 3/2011 Greentstein et al.
2011/0082801 A1* 4/2011 Baghdasaryan ....... G06Q 20/10 705/75
2011/0083016 A1 4/2011 Kesanupalli et al.
2011/0093942 A1 4/2011 Koster et al.
2011/0099361 A1 4/2011 Shah et al.
2011/0107087 A1 5/2011 Lee et al.
2011/0138450 A1 6/2011 Kesanupalli et al.
2011/0157346 A1 6/2011 Zyzdryn et al.
2011/0167154 A1 7/2011 Bush et al.
2011/0167472 A1 7/2011 Evans et al.
2011/0191200 A1 8/2011 Bayer et al.
2011/0197267 A1 8/2011 Gravel et al.
2011/0219427 A1 9/2011 Hito et al.
2011/0225431 A1 9/2011 Stufflebeam, Jr. et al.
2011/0228330 A1 9/2011 Nogawa
2011/0231911 A1 9/2011 White et al.
2011/0246766 A1 10/2011 Orsini et al.
2011/0265159 A1 10/2011 Ronda
2011/0279228 A1 11/2011 Kumar et al.
2011/0280402 A1 11/2011 Ibrahim et al.
2011/0296518 A1 12/2011 Faynberg et al.
2011/0307706 A1 12/2011 Fielder
2011/0307949 A1 12/2011 Ronda et al.
2011/0313872 A1 12/2011 Carter et al.
2011/0314549 A1 12/2011 Song et al.
2011/0320823 A1 12/2011 Saroiu et al.
2012/0018506 A1 1/2012 Hammad et al.
2012/0023568 A1 1/2012 Cha et al.
2012/0046012 A1 2/2012 Forutanpour et al.
2012/0047555 A1 2/2012 Xiao et al.
2012/0066757 A1 3/2012 Vysogorets et al.
2012/0075062 A1 3/2012 Osman et al.
2012/0084566 A1 4/2012 Chin et al.
2012/0102553 A1 4/2012 Hsueh et al.
2012/0124639 A1 5/2012 Shaikh et al.
2012/0124651 A1 5/2012 Ganesan et al.
2012/0144461 A1 6/2012 Rathbun
2012/0159577 A1* 6/2012 Belinkiy ............. G06F 21/6218 726/4
2012/0191979 A1* 7/2012 Feldbau ................ H04L 63/126 713/178
2012/0203906 A1 8/2012 Jaudon et al.
2012/0204032 A1 8/2012 Wilkins et al.
2012/0210135 A1 8/2012 Panchapakesan et al.
2012/0249298 A1 10/2012 Sovio et al.
2012/0272056 A1 10/2012 Ganesan
2012/0278873 A1 11/2012 Calero et al.
2012/0291114 A1 11/2012 Poliashenko et al.
2012/0313746 A1 12/2012 Rahman et al.
2012/0317297 A1 12/2012 Bailey
2013/0042115 A1 2/2013 Sweet et al.
2013/0042327 A1 2/2013 Chow
2013/0046976 A1* 2/2013 Rosati ................... H04L 9/3271 713/168
2013/0046991 A1 2/2013 Lu et al.
2013/0047200 A1 2/2013 Radhakrishnan et al.
2013/0054336 A1 2/2013 Graylin
2013/0054967 A1* 2/2013 Davoust .................. H04L 63/20 713/168
2013/0055370 A1 2/2013 Goldberg et al.
2013/0061055 A1 3/2013 Schibuk
2013/0067546 A1 3/2013 Thavasi et al.
2013/0073859 A1 3/2013 Carlson et al.
2013/0086669 A1 4/2013 Sondhi et al.
2013/0090939 A1 4/2013 Robinson
2013/0097682 A1 4/2013 Zeljkovic
2013/0104187 A1 4/2013 Weidner
2013/0104190 A1 4/2013 Simske
2013/0119130 A1 5/2013 Braams
2013/0124285 A1 5/2013 Pravetz et al.
2013/0124422 A1 5/2013 Hubert et al.
2013/0125197 A1 5/2013 Pravetz et al.
2013/0125222 A1 5/2013 Pravetz et al.
2013/0133049 A1 5/2013 Peirce
2013/0133054 A1 5/2013 Davis et al.
2013/0144785 A1 6/2013 Karpenko
2013/0159413 A1 6/2013 Davis et al.
2013/0159716 A1 6/2013 Buck et al.
2013/0160083 A1 6/2013 Schrix et al.
2013/0160100 A1 6/2013 Langley
2013/0167196 A1 6/2013 Spencer et al.
2013/0191884 A1 7/2013 Leicher et al.

(56) References Cited

U.S. PATENT DOCUMENTS

| | | | |
|---|---|---|---|
| 2013/0212637 | A1* | 8/2013 | Guccione .............. H04L 63/102 726/1 |
| 2013/0219456 | A1 | 8/2013 | Sharma et al. |
| 2013/0227646 | A1 | 8/2013 | Haggerty et al. |
| 2013/0239173 | A1 | 9/2013 | Dispensa |
| 2013/0282589 | A1 | 10/2013 | Shoup et al. |
| 2013/0308778 | A1 | 11/2013 | Fosmark et al. |
| 2013/0318343 | A1 | 11/2013 | Bjarnason et al. |
| 2013/0326215 | A1 | 12/2013 | Leggette et al. |
| 2013/0337777 | A1 | 12/2013 | Deutsch et al. |
| 2013/0346176 | A1 | 12/2013 | Alolabi et al. |
| 2014/0002238 | A1 | 1/2014 | Taveau et al. |
| 2014/0007215 | A1 | 1/2014 | Romano |
| 2014/0013422 | A1 | 1/2014 | Janus et al. |
| 2014/0033271 | A1 | 1/2014 | Barton et al. |
| 2014/0040987 | A1 | 2/2014 | Haugsnes |
| 2014/0044265 | A1 | 2/2014 | Kocher et al. |
| 2014/0047510 | A1 | 2/2014 | Belton et al. |
| 2014/0066015 | A1 | 3/2014 | Aissi |
| 2014/0068746 | A1 | 3/2014 | Gonzalez et al. |
| 2014/0075516 | A1 | 3/2014 | Chermside |
| 2014/0089243 | A1 | 3/2014 | Oppenheimer |
| 2014/0096182 | A1 | 4/2014 | Smith |
| 2014/0101439 | A1 | 4/2014 | Pettigrew et al. |
| 2014/0109174 | A1 | 4/2014 | Barton |
| 2014/0115702 | A1 | 4/2014 | Li et al. |
| 2014/0130127 | A1 | 5/2014 | Toole et al. |
| 2014/0137191 | A1 | 5/2014 | Goldsmith et al. |
| 2014/0164776 | A1 | 6/2014 | Hook et al. |
| 2014/0173754 | A1 | 6/2014 | Barbir |
| 2014/0188770 | A1 | 7/2014 | Agrafioti et al. |
| 2014/0189350 | A1 | 7/2014 | Baghdasaryan et al. |
| 2014/0189360 | A1 | 7/2014 | Baghdasaryan et al. |
| 2014/0189779 | A1 | 7/2014 | Baghdasaryan et al. |
| 2014/0189791 | A1 | 7/2014 | Lindemann et al. |
| 2014/0189807 | A1 | 7/2014 | Cahill et al. |
| 2014/0189808 | A1 | 7/2014 | Mahaffey et al. |
| 2014/0189828 | A1 | 7/2014 | Baghdasaryan et al. |
| 2014/0189835 | A1 | 7/2014 | Umerley |
| 2014/0201809 | A1 | 7/2014 | Choyi et al. |
| 2014/0230032 | A1 | 8/2014 | Duncan |
| 2014/0245391 | A1 | 8/2014 | Adenuga |
| 2014/0250523 | A1 | 9/2014 | Savvides et al. |
| 2014/0258125 | A1 | 9/2014 | Gerber et al. |
| 2014/0258711 | A1 | 9/2014 | Brannon |
| 2014/0279516 | A1 | 9/2014 | Rellas et al. |
| 2014/0282868 | A1 | 9/2014 | Sheller et al. |
| 2014/0282945 | A1 | 9/2014 | Smith et al. |
| 2014/0282965 | A1 | 9/2014 | Sambamurthy et al. |
| 2014/0289117 | A1 | 9/2014 | Baghdasaryan |
| 2014/0289820 | A1 | 9/2014 | Lindemann et al. |
| 2014/0289833 | A1 | 9/2014 | Briceno et al. |
| 2014/0289834 | A1 | 9/2014 | Lindemann |
| 2014/0298419 | A1 | 10/2014 | Boubez |
| 2014/0304505 | A1 | 10/2014 | Dawson |
| 2014/0335824 | A1 | 11/2014 | Abraham |
| 2014/0337948 | A1 | 11/2014 | Hoyos |
| 2015/0046340 | A1 | 2/2015 | Dimmick |
| 2015/0058931 | A1 | 2/2015 | Miu et al. |
| 2015/0095999 | A1 | 4/2015 | Toth et al. |
| 2015/0121068 | A1 | 4/2015 | Lindemann et al. |
| 2015/0134330 | A1 | 5/2015 | Baldwin et al. |
| 2015/0142628 | A1 | 5/2015 | Suplee et al. |
| 2015/0180869 | A1 | 6/2015 | Verma |
| 2015/0244525 | A1 | 8/2015 | McCusker et al. |
| 2015/0244696 | A1 | 8/2015 | Ma |
| 2015/0269050 | A1 | 9/2015 | Filimonov |
| 2015/0326529 | A1 | 11/2015 | Morita |
| 2015/0373039 | A1 | 12/2015 | Wang |
| 2015/0381580 | A1 | 12/2015 | Graham et al. |
| 2016/0036588 | A1 | 2/2016 | Thackston |
| 2016/0072787 | A1 | 3/2016 | Balabine et al. |
| 2016/0078869 | A1 | 3/2016 | Syrdal et al. |
| 2016/0087952 | A1 | 3/2016 | Tartz et al. |
| 2016/0087957 | A1 | 3/2016 | Shah et al. |
| 2016/0188958 | A1 | 6/2016 | Martin |
| 2017/0004487 | A1 | 1/2017 | Hagen et al. |
| 2017/0048070 | A1 | 2/2017 | Gulati et al. |
| 2017/0109751 | A1 | 4/2017 | Dunkelberger et al. |
| 2017/0195121 | A1 | 7/2017 | Frei et al. |
| 2017/0221068 | A1 | 8/2017 | Krauss et al. |
| 2018/0191501 | A1 | 7/2018 | Lindemann |
| 2018/0191695 | A1 | 7/2018 | Lindemann |

FOREIGN PATENT DOCUMENTS

| | | | |
|---|---|---|---|
| CN | 101495956 | A | 7/2009 |
| CN | 102713922 | A | 10/2012 |
| CN | 102763111 | A | 10/2012 |
| CN | 103999401 | A | 8/2014 |
| EP | 2357754 | A1 | 8/2011 |
| JP | 2003143136 | A | 5/2003 |
| JP | 2004348308 | A | 12/2004 |
| JP | 2007220075 | A | 8/2007 |
| JP | 2008065844 | A | 3/2008 |
| JP | 2013016070 | A | 1/2013 |
| TW | 200701120 | A | 1/2007 |
| TW | 201121280 | A | 6/2011 |
| WO | 03017159 | A1 | 2/2003 |
| WO | 2005003985 | A1 | 1/2005 |
| WO | 2007023756 | A1 | 3/2007 |
| WO | 2009158530 | A2 | 12/2009 |
| WO | 2013082190 | A1 | 6/2013 |
| WO | 2014105994 | A2 | 7/2014 |
| WO | 2015130734 | A1 | 9/2015 |

OTHER PUBLICATIONS

Notification of Transmittal of the International Search Report and the Written Opinion from counterpart Patent Cooperation Treaty Application No. PCT/US2015/042870, dated Oct. 30, 2015, 9 pages.

Notification of Transmittal of the International Search Report and the Written Opinion from counterpart Patent Cooperation Treaty Application No. PCT/US2015/42827, dated Oct. 30, 2015, 9 pages.

Validity, OSTP Framework, 24 pages, 2010.

Notice of Allowance from U.S. Appl. No. 14/268,686, dated Nov. 5, 2015, 23 pages.

Notification of Transmittal of the International Search Report and the Written Opinion from counterpart Patent Cooperation Treaty Application No. PCT/US15/50348, dated Dec. 22, 2015, 9 pages.

Office Action from U.S. Appl. No. 14/448,868, dated Dec. 3, 2015, 15 pages.

Office Action from U.S. Appl. No. 14/487,992, dated Dec. 31, 2015, 12 pages.

Final Office Action from U.S. Appl. No. 14/268,619, dated Dec. 14, 2015, 10 pages.

Notification of Transmittal of International Search Report and Written Opinion from PCT/US2015/028927, dated Jul. 30, 2015, 12 pages.

Transmittal of International Preliminary Report on Patentability from foreign counterpart PCT Patent Application No. PCT/US2014/039627 dated Dec. 10, 2015, 8 pages.

Notice of Allowance from U.S. Appl. No. 14/448,697, dated Jan. 14, 2016, 23 pages.

Final Office Action from U.S. Appl. No. 14/268,733, dated Jan. 15, 2016, 14 pages.

Notice of Allowance from U.S. Appl. No. 14/145,533, dated Jan. 20, 2016, 12 pages.

Office Action from U.S. Appl. No. 14/218,743, dated Jan. 21, 2016, 12 pages.

Office Action from U.S. Appl. No. 14/218,551, dated Jan. 21, 2016, 11 pages.

Office Action from U.S. Appl. No. 14/218,575, dated Jan. 29, 2016, 25 pages.

Transmittal of International Preliminary Report on Patentability from foreign counterpart PCT Patent Application No. PCT/US2014/031344 dated Oct. 1, 2015, 9 pages.

(56) References Cited

OTHER PUBLICATIONS

Notice of Allowance from U.S. Appl. No. 14/145,607, dated Feb. 1, 2016, 28 pages.
Final Office Action from U.S. Appl. No. 14/066,273, dated Feb. 11, 2016, 29 pages.
Final Office Action from U.S. Appl. No. 14/218,692, dated Mar. 2, 2016, 24 pages.
Final Office Action from U.S. Appl. No. 14/218,646, dated Mar. 10, 2016, 23 pages.
Notice of Allowance from U.S. Appl. No. 14/145,439, dated Mar. 14, 2016, 17 pages.
Notice of Allowance from U.S. Appl. No. 14/066,384, dated Mar. 17, 2016, 40 pages.
Office Action from U.S. Appl. No. 14/268,619, dated Mar. 21, 2016, 7 pages.
Notice of Allowance from U.S. Appl. No. 14/268,686, dated Mar. 30, 2016, 38 pages.
Office Action from U.S. Appl. No. 14/218,551, dated May 12, 2016, 11 pages.
Office Action from U.S. Appl. No. 14/448,868, dated May 12, 2016, 11 pages.
Delac K. et al., Eds., "Image Compression in Face Recognition a Literature Survey," InTech, Jun. 1, 2008, ISBN 978-953-7619-34-3, Uploaded as individual Chapters 1-15, downloaded from https://www.intechopen.com/books/recent_advances_in_face_recognition/image_compression_in_face_recognition_-_a_literature_survey, 15 pages.
Extended European Search Report for Application No. 15786487.7, dated Oct. 23, 2017, 8 pages.
Extended European Search Report for Application No. 15786796.1, dated Nov. 3, 2017, 9 pages.
Extended European Search Report for Application No. 15826660.1, dated Nov. 16, 2017, 9 pages.
Extended European Search Report for Application No. 15827334.2, dated Nov. 17, 2017, 8 pages.
Final Office Action from U.S. Appl. No. 14/066,273, dated Sep. 8, 2017, 30 pages.
Final Office Action from U.S. Appl. No. 14/218,504, dated Sep. 12, 2017, 83 pages.
Final Office Action from U.S. Appl. No. 14/218,575, dated Jul. 31, 2017, 42 pages.
Final Office Action from U.S. Appl. No. 14/218,646, dated Sep. 27, 2017, 81 pages.
Final Office Action from U.S. Appl. No. 14/218,677, dated Sep. 28, 2017, 16 pages.
Final Office Action from U.S. Appl. No. 14/268,563, dated Nov. 3, 2017, 46 pages.
Final Office Action from U.S. Appl. No. 14/448,814 dated Oct. 6, 2017, 24 pages.
First Office Action and Search Report from foreign counterpart China Patent Application No. 201380068869.3, dated Sep. 19, 2017, 17 pages.
First Office Action and Search Report from foreign counterpart China Patent Application No. 201480025959.9, dated Jul. 7, 2017, 10 pages.
GSM Arena, "Ice Cream Sandwich's Face Unlock duped using a photograph," Nov. 13, 2011, downloaded from http://www.gsmarena.com/ice_cream_sandwichs_face_unlock_duped_using_a_photograph-news-3377.php on Aug. 18, 2015, 2 pages.
International Preliminary Report on Patentability for Application No. PCT/US2015/042786, dated Feb. 9, 2017, 7 pages.
International Preliminary Report on Patentability for Application No. PCT/US2015/042799, dated Feb. 9, 2017, 7 pages.
International Preliminary Report on Patentability for Application No. PCT/US2015/042870, dated Feb. 9, 2017, 8 pages.
International Preliminary Report on Patentability for Application No. PCT/US2015/050348, dated Mar. 30, 2017, 7 pages.
International Preliminary Report on Patentability for Application No. PCT/US2015/42783, dated Feb. 9, 2017, 12 pages.
International Preliminary Report on Patentability for Application No. PCT/US2015/42827, dated Feb. 9, 2017, 6 pages.
International Search Report and Written Opinion for Application No. PCT/US2017/045534, dated Nov. 27, 2017, 14 pages.
Jafri R., et al. "A Survey of Face Recognition Techniques," Journal of Information Processing Systems, 2009, vol. 5 (2), pp. 41-68.
Julian J., et al., "Biometric Enabled Portable Trusted Computing Platform," Trust Security and Privacy in Computing and Communications (TRUSTCOM), 2011 IEEE 10th International Conference on Nov. 16, 2011, pp. 436-442, XP032086831, DOI:10.1109/TRUSTCOM.2011.56, ISBN: 978-1-4577-2135-9.
Kim H.C., et al., "A Design of One-Time Password Mechanism Using Public Key Infrastructure," Networked Computing and Advanced Information Management, 2008, NCM'08, 4th International Conference on IEEE, Sep. 2, 2008, pp. 18-24.
Martins R A., et al., "A Potpourri of Authentication Mechanisms the Mobile Device Way," CISTI, Jan. 2013, pp. 843-848.
Non-Final Office Action from U.S. Appl. No. 14/066,273, dated May 18, 2017, 46 pages.
Non-Final Office Action from U.S. Appl. No. 14/218,575, dated May 4, 2017, 88 pages.
Non-Final Office Action from U.S. Appl. No. 14/218,611, dated Sep. 19, 2017, 76 pages.
Non-Final Office Action from U.S. Appl. No. 14/218,646, dated Mar. 27, 2017, 24 pages.
Non-Final Office Action from U.S. Appl. No. 14/218,743, dated Aug. 2, 2017, 24 pages.
Non-final Office Action from U.S. Appl. No. 14/268,563, dated Apr. 21, 2017, 83 pages.
Non-Final Office Action from U.S. Appl. No. 14/448,814, dated Apr. 5, 2017, 57 pages.
Non-Final Office Action from U.S. Appl. No. 14/859,328, dated Jul. 14, 2017, 29 pages.
Non-Final Office Action from U.S. Appl. No. 15/396,452 dated Oct. 13, 2017, 76 pages.
Non-Final Office action from U.S. Appl. No. 15/595,460, dated Jul. 27, 2017, 09 pages.
Notice of Allowance from U.S. Appl. No. 14/066,384, dated Dec. 1, 2017, 17 pages.
Notice of Allowance from U.S. Appl. No. 14/066,384, dated Jul. 26, 2017, 20 pages.
Notice of Allowance from U.S. Appl. No. 14/066,384, dated May 23, 2017, 50 pages.
Notice of Allowance from U.S. Appl. No. 14/218,551, dated Aug. 16, 2017, 24 pages.
Notice of Allowance from U.S. Appl. No. 14/448,747, dated Jun. 20, 2017, 14 pages.
Notice of Allowance from U.S. Appl. No. 14/448,868, dated Apr. 27, 2017, 62 pages.
Notice of Allowance from U.S. Appl. No. 14/448,868, dated Jun. 26, 2017, 14 pages.
Notice of Allowance from U.S. Appl. No. 14/448,868, dated Mar. 23, 2017, 57 pages.
Notice of Allowance from U.S. Appl. No. 14/448,868, dated Nov. 17, 2017, 15 pages.
Notice of Allowance from U.S. Appl. No. 14/487,992, dated Apr. 12, 2017, 14 pages.
Notice of Allowance from U.S. Appl. No. 14/487,992, dated Jul. 17, 2017, 8 pages.
Notice of Allowance from U.S. Appl. No. 14/487,992, dated Jun. 14, 2017, 14 pages.
Tan et al., "Face Liveness Detection from a Single Image with Sparse Low Rank Bilinear Discriminative Model," European Conference on Computer Vision, 2010, vol. 2010, pp. 1-14.
Tresadern P., et al., "Mobile Biometrics (MoBio): Joint Face and Voice Verification for a Mobile Platform", 2012, 7 pages. Retrieved from the Internet: URL: http://personal.ee.surrey.ac.uk/Personai/Norman.Poh/data/tresadern_PervComp2012draft.pdf.
Tronci R., et al., "Fusion of Multiple Clues for Photo-Attack Detection in Face Recognition Systems," International Joint Conference on Biometrics, 2011. pp. 1-6.

(56) References Cited

OTHER PUBLICATIONS

Uludag, Umut, and Anil K. Jain. "Attacks on biometric systems: a case study in fingerprints." Electronic Imaging 2004. International Society for Optics and Photonics, 2004, 12 pages.
Unobtrusive User-Authentication on Mobile Phones using Biometric Gait Recognition, 2010, 6 pages.
Vassilev, A.T.; du Castel, B.; Ali, A.M., "Personal Brokerage of Web Service Access," Security & Privacy, IEEE , vol. 5, No. 5, pp. 24-31, Sep.-Oct. 2007.
WikiPedia article for Eye Tracking, 15 pages, Last Modified Jun. 21, 2014, en.wikipedia.org/wiki/Eye_tracking.
Willis N., Linux.com. Weekend Project: Take a Tour of Open Source Eye-Tracking Software. [Online] Mar. 2, 2012. [Cited: Nov. 1, 2012.], 4 pages. Retrieved from the Internet: URL: https://www.linux.com/learn/tutorials/550880-weekend-project-take-a-tour-of-opensource-eye-tracking-software.
Wilson R., "How to Trick Google's New Face Unlock on Android 4.1 Jelly Bean," Aug. 6, 2012, 5 pages, [online], [retrieved Aug. 13, 2015]. Retrieved from the Internet.
World Wide Web Consortium, W3C Working Draft: Media Capture and Streams, 2013, 36 pages.
Zhang, "Security Verification of Hardware-enabled Attestation Protocols," IEEE, 2012, pp. 47-54.
Zhao W., et al., "Face Recognition: A Literature Survey," ACM Computing Surveys, 2003, vol. 35 (4), pp. 399-458.
Zhou, et al., "Face Recognition from Still Images and Videos". University of Maryland, College Park, MD 20742. Maryland : s.n., Nov. 5, 2004.pp. 1-23, Retrieved from the Internet: http://citeseerx.ist.psu.edu/viewdoc/download?doi=1 0.1.1.77.1312&rep=rep1 &type=pdf.
Kollreider K., et al., "Evaluating Liveness by Face Images and the Structure Tensor," Halmstad, Sweden: s.n., Halmstad University, SE-30118, Sweden, [online], 2005, Retrieved from the Internet: URL: http://citeseerx.ist.psu.edu/viewdoc/download?doi=10.1.1.62.6534&rep=rep1 &type=pdf, pp. 75-80.
Kollreider K., et al., "Non-Instrusive Liveness Detection by Face Images," Image and Vision Computing, 2007, vol. 27 (3), pp. 233-244.
Kong S., et al. "Recent Advances in Visual and Infrared Face Recognition: A Review," Journal of Computer Vision and Image Understanding, 2005, vol. 97 (1), pp. 103-135.
Li J., et al., "Live Face Detection Based on the Analysis of Fourier Spectra," Biometric Technology for Human Identification, 2004, pp. 296-303.
Lubin, G., et al., "16 Heatmaps That Reveal Exactly Where People Look," Business Insider, [online], May 21, 2012, [Cited: Nov. 1, 2012], Retrieved from the Internet: URL: http://www.businessinsider.com/eye-tracking-heatmaps-2012-5?pp=1, pp. 1-21.
Maatta J., et al., "Face Spoofing Detection From Single Images Using Micro-Texture Analysis," Machine Vision Group, University of Oulu, Finland, Oulu, IEEE, [online], 2011, Retrieved from the Internet: URL: http://www.ee.oulu.fi/research/mvmp/mvg/files/pdf/131.pdf., pp. 1-7.
Marcialis G.L., et al. "First International Fingerprint Liveness Detection Competition—Livdet 2009," Image Analysis and Processing—ICIAP, Springer Berlin Heidelberg, 2009. pp. 12-23.
Mobile Device Security Using Transient Authentication, IEEE Transactions on Mobile Computing, 2006, vol. 5 (11), pp. 1489-1502.
National Science & Technology Council's Subcommittee on Biometrics. Biometrics Glossary. 33 pages, Last updated Sep. 14, 2006. NSTC. http://www.biometrics.gov/documents/glossary.pdf.
Nielsen, Jakib. useit.com. Jakob Nielsen's Alertbox—Horizontal Attention Leans Left. [Online] Apr. 6, 2010. [Cited: Nov. 1, 2012.] 4 pages. http://www.useit.com/alertbox/horizontal-attention.html.
Nielsen, Jakob. useit.com. Jakob Nielsen's Alertbox—Scrolling and Attention. [Online] Mar. 22, 2010. [Cited: Nov. 1, 2012.] 6 pages. http://www.useit.com/alertbox/scrolling-attention.html.
Non-Final Office Action from U.S. Appl. No. 13/730,761 dated Feb. 27, 2014, 24 pages.
Non-Final Office Action from U.S. Appl. No. 13/730,761 dated Sep. 9, 2014, 36 pages.
Non-Final Office Action from U.S. Appl. No. 13/730,776 dated Jul. 15, 2014, 16 pages.
Non-Final Office Action from U.S. Appl. No. 13/730,780 dated Aug. 4, 2014, 30 pages.
Non-Final Office Action from U.S. Appl. No. 13/730,780 dated Mar. 12, 2014, 22 pages.
Non-Final Office Action from U.S. Appl. No. 13/730,791 dated Jun. 27, 2014, 17 pages.
Non-Final Office Action from U.S. Appl. No. 13/730,795 dated Jan. 5, 2015, 19 pages.
Non-Final Office Action from U.S. Appl. No. 13/730,795 dated Jun. 11, 2014, 14 pages.
Non-Final Office Action from U.S. Appl. No. 14/066,273 dated Jun. 16, 2016, 43 pages.
Non-Final Office Action from U.S. Appl. No. 14/066,273 dated May 8, 2015, 31 pages.
Non-Final Office Action from U.S. Appl. No. 14/066,384 dated Jan. 7, 2015, 24 pages.
Non-Final Office Action from U.S. Appl. No. 14/145,439 dated Feb. 12, 2015, 18 pages.
Non-Final Office Action from U.S. Appl. No. 14/145,466 dated Sep. 9, 2016, 13 pages.
Non-Final Office Action from U.S. Appl. No. 14/145,533 dated Jan. 26, 2015, 13 pages.
Non-Final Office Action from U.S. Appl. No. 14/145,607 dated Mar. 20, 2015, 22 pages.
Non-Final Office Action from U.S. Appl. No. 14/218,504, dated Feb. 27, 2017, 12 pages.
Non-Final Office Action from U.S. Appl. No. 14/218,551 dated Apr. 23, 2015, 9 pages.
Non-Final Office Action from U.S. Appl. No. 14/218,575 dated Feb. 10, 2015, 17 pages.
Non-Final Office Action from U.S. Appl. No. 14/218,611 dated Jun. 16, 2016, 13 pages.
Non-Final Office Action from U.S. Appl. No. 14/218,677 dated Aug. 2, 2016, 15 pages.
Non-Final Office Action from U.S. Appl. No. 14/218,677, dated Feb. 10, 2017, 18 pages.
Non-Final Office Action from U.S. Appl. No. 14/218,743 dated Aug. 19, 2016, 11 pages.
Non-Final Office Action from U.S. Appl. No. 14/268,619 dated Aug. 24, 2015, 17 pages.
Non-Final Office Action from U.S. Appl. No. 14/268,733 dated Jul. 16, 2015, 13 pages.
Non-Final Office Action from U.S. Appl. No. 14/448,641 dated Nov. 9, 2015, 21 pages.
Non-Final Office Action from U.S. Appl. No. 14/448,747 dated Aug. 19, 2016, 21 pages.
Non-Final Office Action from U.S. Appl. No. 14/448,814 dated Aug. 4, 2015, 13 pages.
Non-Final Office Action from U.S. Appl. No. 14/448,868 dated Dec. 31, 2015, 12 pages.
Non-Final Office Action from U.S. Appl. No. 14/487,992 dated Dec. 3, 2015, 15 pages.
Non-Final Office Action from U.S. Appl. No. 14/859,328 dated Sep. 15, 2016, 39 pages.
Notice of Allowance from U.S. Appl. No. 14/487,992 dated May 12, 2016, 11 pages.
Notice of Allowance from U.S. Appl. No. 13/730,761 dated Jun. 10, 2015, 15 pages.
Notice of Allowance from U.S. Appl. No. 13/730,761 dated Sep. 28, 2015, 5 pages.
Notice of Allowance from U.S. Appl. No. 13/730,776 dated Feb. 13, 2015, 16 pages.
Notice of Allowance from U.S. Appl. No. 13/730,776 dated Mar. 24, 2015, 3 pages.
Notice of Allowance from U.S. Appl. No. 13/730,780 dated Aug. 13, 2015, 13 pages.
Notice of Allowance from U.S. Appl. No. 13/730,791 dated Mar. 10, 2015, 17 pages.

(56) References Cited

OTHER PUBLICATIONS

Notice of Allowance from U.S. Appl. No. 13/730,795 dated Jan. 14, 2016, 11 pages.
Notice of Allowance from U.S. Appl. No. 13/730,795 dated May 15, 2015, 8 pages.
Abate A., et al.,"2D and 3D face recognition: A survey", 2007, pp. 1885-1906.
Advisory Action from U.S. Appl. No. 13/730,791 dated Jan. 23, 2015, 4 pages.
Akhtar Z., et al., "Spoof Attacks on Multimodal Biometric Systems", International Conference on Information and Network Technology, 2011, vol. 4, pp. 46-51.
Bao, W., et al., "A liveness detection method for face recognition based on optical flow field", 2009, pp. 233-236, http://ieeexplore.ieee.org/stamp/stamp.jsp?tp=&arnumber=5054589&isnumber=5054562.
Barker E., et al., "Recommendation for key management Part 3: Application-Specific Key Management Guidance", NIST Special Publication 800-57, 2009, pp. 1-103.
BehavioSec, "Measuring FAR/FRR/EER in Continuous Authentication," Stockholm, Sweden (2009), 8 pages.
Brickell, E., et al., Intel Corporation; Jan Camenish, IBM Research; Liqun Chen, HP Laboratories. "Direct Anonymous Attestation". Feb. 11, 2004, pp. 1-28 [online]. Retrieved from the Internet: URL:https://eprint.iacr.org/2004/205.pdf.
Chakka M., et al., "Competition on Counter Measures to 2-D Facial Spoofing Attacks". 6 pages .2011. http://www.csis.pace.edu/-ctappert/dps/IJCB2011/papers/130.pdf. 978-1-4577-1359-0/11.
Chen L., et al., "Flexible and scalable digital signatures in TPM 2.0." Proceedings of the 2013 ACM SIGSAC conference on Computer & communications security. ACM, 2013, 12 pages.
Chetty G. School of ISE University of Canberra Australia. "Multilevel liveness verification for face-voice biometric authentication". BYSM-2006 Symposium. Baltimore: BYSM-Symposium 9 pages. Sep. 19, 2006. http://www.biometrics.org/bc2006/presentations/Tues_Sep_19/BSYM/19_Chetty_research.pdf.
Communication pursuant to Rules 161(2) and 162 EPC for EP Application No. 15826364.0, dated Mar. 7, 2017, 2 pages.
Crazy Egg Heatmap Shows Where People Click on Your Website, 2012, 3 pages, www.michaelhartzell.com/Blog/bid/92970/Crazy-Egg-Heatmap-shows-where-people-click-on-your-website).
Dawei Zhang; Peng Hu, "Trusted e-commerce user agent based on USB Key", Proceedings of the International MultiConference of Engineers and Computer Scientists 2008 vol. I, IMECS 2008, Mar. 19-21, 2008, Hong Kong, 7 pages.
Doherty, et al., Internet Engineering Task Force (IETF), "Dynamic Symmetric Key Provisioning Protocol (DSKPP)", Dec. 2010, 105 pages.
Extended European Search Report for Application No. 13867269, dated Nov. 4, 2016, 10 pages.
Extended European Search Report for Application No. 14803988.6, dated Dec. 23, 2016, 10 pages.
Extended European Search Report from European Patent Application No. 14770682.4, dated Jan. 17, 2017, 14 pages.
Final Office Action from U.S. Appl. No. 13/730,761 dated Jan. 15, 2015, 31 pages.
Final Office Action from U.S. Appl. No. 13/730,761 dated Jul. 8, 2014, 36 pages.
Final Office Action from U.S. Appl. No. 13/730,776 dated Nov. 3, 2014, 20 pages.
Final Office Action from U.S. Appl. No. 13/730,780 dated Jan. 27, 2015, 30 pages.
Final Office Action from U.S. Appl. No. 13/730,780 dated May 12, 2014, 34 pages.
Final Office Action from U.S. Appl. No. 13/730,791 dated Nov. 13, 2014, 22 pages.
Final Office Action from U.S. Appl. No. 13/730,795 dated Aug. 14, 2014, 20 pages.
Final Office Action from U.S. Appl. No. 14/066,273, dated Jan. 10, 2017, 24 pages.
Final Office Action from U.S. Appl. No. 14/066,384 dated Aug. 20, 2015, 23 pages.
Final Office Action from U.S. Appl. No. 14/145,466, dated Apr. 13, 2017, 61 pages.
Final Office Action from U.S. Appl. No. 14/218,551 dated Sep. 9, 2015, 15 pages.
Final Office Action from U.S. Appl. No. 14/218,551 dated Sep. 16, 2016, 11 pages.
Final Office Action from U.S. Appl. No. 14/218,575 dated Aug. 7, 2015, 19 pages.
Final Office Action from U.S. Appl. No. 14/218,575 dated Jul. 7, 2016, 29 pages.
Final Office Action from U.S. Appl. No. 14/218,611, dated Jan. 27, 2017, 14 pages.
Final Office Action from U.S. Appl. No. 14/218,646 dated Aug. 11, 2016, 25 pages.
Final Office Action from U.S. Appl. No. 14/218,743, dated Mar. 3, 2017, 67 pages.
Final Office Action from U.S. Appl. No. 14/448,747, dated Feb. 13, 2017, 74 pages.
Final Office Action from U.S. Appl. No. 14/448,814 dated Feb. 16, 2016, 14 pages.
Final Office Action from U.S. Appl. No. 14/448,814 dated Jun. 14, 2016, 17 pages.
Final Office Action from U.S. Appl. No. 14/448,868 dated Aug. 19, 2016, 11 pages.
Final Office Action from U.S. Appl. No. 14/859,328, dated Mar. 6, 2017, 26 pages.
Grother, P.J., et al., NIST. Report on the Evaluation of 2D Still-Image Face Recognition Algorithms, NIST IR 7709. s.l, NIST, 2011, Jun. 22, 2010, pp. 1-58.
Heikkila M., et al., "A Texture-Based Method for Modeling the Background and Detecting Moving Objects", Oulu : IEEE , Jun. 22, 2005, Draft, Retrieved from the Internet: http://www.ee.oulu.fi/mvg/files/pdf/pdf_662.pdf, 16 pages.
Hernandez, T., "But What Does It All Mean? Understanding Eye-Tracking Results (Part 3)", Sep. 4, 2007, 2 pages. EyeTools. Part III: What is a heatmap . . . really? [Online] [Cited: Nov. 1, 2012.] Retrieved from the Internet: URL:http://eyetools.com/articles/p3-understanding-eye-tracking-what-is-a-heatmap-really.
Himanshu, et al., "A Review of Face Recognition". International Journal of Research in Engineering & Applied Sciences. Feb. 2012, vol. 2, pp. 835-846. Retrieved from the Internet: URL:http://euroasiapub.org/IJREAS/Feb2012/81.pdf.
Huang L., et al., "Clickjacking: Attacks and Defenses". S.I. : Usenix Security 2012, pp. 1-16, 2012 [online]. Retrieved from the Internet: URL:https://www.usenix.org/system/files/conference/usenixsecurity12/sec12-final39.pdf.
International Preliminary Report on Patentability for Application No. PCT/US2015/028924 dated Nov. 17, 2016, 9 pages.
International Preliminary Report on Patentability for Application No. PCT/US2015/028927 dated Nov. 17, 2016, 10 pages.
International Search Report and Written Opinion for Application No. PCT/US2015/028924 dated Jul. 30, 2015, 10 pages.
RFC 2560: Myers M., et al., "The Online Certificate Status Protocol, OCSP," Network working group, Jun. 1999, RFC 2560, 22 pages.
Starnberger G., et al., "QR-TAN: Secure Mobile Transaction Authentication," Availability, Reliability and Security, 2009, ARES'09, International Conference on IEEE, Mar. 16, 2009, pp. 578-585.
The Extended M2VTS Database, [Online] [Cited: Sep. 29, 2012] downloaded from http://www.ee.surrey.ac.uk/CVSSP/xm2vtsdb/ on Jan. 28, 2015, 1 page.
Uymatiao M.L.T., et al., "Time-based OTP authentication via secure tunnel (TOAST); A mobile TOTP scheme using TLS seed exchage and encrypted offline keystore," 2014 4th IEEE International Conference on Information Science and Technology, IEEE, Apr. 26, 2014, pp. 225-229.
Notice of Allowance from U.S. Appl. No. 14/218,551, dated Dec. 13, 2017, 13 pages.
Office Action and Search Report from foreign counterpart Chinese Patent Application No. 201480031042.X, dated Dec. 4, 2017, 10 pages.

(56) References Cited

OTHER PUBLICATIONS

Notice of Allowance from U.S. Appl. No. 13/730,795 dated Sep. 17, 2015, 11 pages.
Notice of Allowance from U.S. Appl. No. 14/066,384 dated Sep. 27, 2016, 19 pages.
Notice of Allowance from U.S. Appl. No. 14/145,439 dated Jul. 6, 2015, 6 pages.
Notice of Allowance from U.S. Appl. No. 14/145,439 dated Oct. 28, 2015, 12 pages.
Notice of Allowance from U.S. Appl. No. 14/145,533 dated May 11, 2015, 5 pages.
Notice of Allowance from U.S. Appl. No. 14/145,533 dated Sep. 14, 2015, 13 pages.
Notice of Allowance from U.S. Appl. No. 14/145,607 dated Sep. 2, 2015, 19 pages.
Notice of Allowance from U.S. Appl. No. 14/218,551, dated Feb. 8, 2017, 56 pages.
Notice of Allowance from U.S. Appl. No. 14/218,551, dated Mar. 1, 2017, 7 pages.
Notice of Allowance from U.S. Appl. No. 14/268,619 dated Oct. 3, 2016, 65 pages.
Notice of Allowance from U.S. Appl. No. 14/268,619 dated Jul. 19, 2016, 5 pages.
Notice of Allowance from U.S. Appl. No. 14/268,686 dated Apr. 18, 2016, 16 pages.
Notice of Allowance from U.S. Appl. No. 14/268,686 dated Jul. 8, 2016, 4 pages.
Notice of Allowance from U.S. Appl. No. 14/268,733 dated Sep. 23, 2016, 8 pages.
Notice of Allowance from U.S. Appl. No. 14/268,733 dated Jan. 20, 2017, 62 pages.
Notice of Allowance from U.S. Appl. No. 14/448,641 dated Jun. 7, 2016, 13 pages.
Notice of Allowance from U.S. Appl. No. 14/448,697 dated May 20, 2016, 14 pages.
Notice of Allowance from U.S. Appl. No. 14/448,697 dated Sep. 1, 2016, 3 pages.
Notice of Allowance from U.S. Appl. No. 14/448,697 dated Sep. 15, 2015, 14 pages.
Notice of Allowance from U.S. Appl. No. 14/487,992 dated Dec. 27, 2016, 28 pages.
Notice of Allowance from U.S. Appl. No. 14/487,992 dated Sep. 6, 2016, 26 pages.
Notification of Transmittal of the International Search Report and the Written Opinion from counterpart Patent Cooperation Treaty Application No. PCT/US13/77888, dated Aug. 4, 2014, 10 pages.
Notification of Transmittal of the International Search Report and the Written Opinion from counterpart Patent Cooperation Treaty Application No. PCT/US14/31344, dated Nov. 3, 2014, 16 pages.
Notification of Transmittal of the International Search Report and the Written Opinion from counterpart Patent Cooperation Treaty Application No. PCT/US14/39627, dated Oct. 16, 2014, 10 pages.
Notification of Transmittal of the International Search Report and the Written Opinion from counterpart Patent Cooperation Treaty Application No. PCT/US2015/042786, dated Oct. 16, 2015, 8 pages.
Notification of Transmittal of the International Search Report and the Written Opinion from counterpart Patent Cooperation Treaty Application No. PCT/US2015/042799, dated Oct. 16, 2015, 8 pages.
Notification of Transmittal of the International Search Report and the Written Opinion from counterpart Patent Cooperation Treaty Application No. PCT/US2015/42783, dated Oct. 19, 2015, 13 pages.
Office Action from foreign counterpart Taiwan Patent Application No. 102148853, dated Feb. 17, 2017, 5 pages.
Pan G., et al., "Liveness Detection for Face Recognition" in: Recent Advances in Face Recognition, 2008, pp. 109-124, Vienna : I-Tech, 2008, Ch. 9, ISBN: 978-953-7619-34-3.
Pan G., et al., "Monocular Camera-based Face Liveness Detection by Combining Eyeblink and Scene Context," pp. 215-225, s.l. : Springer Science+Business Media, LLC, Aug. 4, 2010. Retrieved from the Internet: URL: http://www.cs.zju.edu.cn/-gpan/publication/2011-TeleSysliveness.pdf.
Partial Supplementary European Search Report from European Patent Application No. 14770682.4, dated Oct. 14, 2016, 8 pages.
Peng Y., et al., "RASL: Robust Alignment by Sparse and Low-Rank Decomposition for Linearly Correlated Images", IEEE Conference on Computer Vision and Pattern Recognition, 2010, pp. 763-770. Retrieved from the Internet: URL: http://yima.csl.illinois.edu/psfile/RASL CVPR10.pdf.
Phillips P. J., et al., "Biometric Image Processing and Recognition," Chellappa, 1998, Eusipco, 8 pages.
Phillips P.J., et al., "Face Recognition Vendor Test 2002: Evaluation Report," s.l. : NISTIR 6965, 2002, 56 pages. Retrieved from the Internet: URL: http://www.facerec.org/vendors/FRVT2002_Evaluation_Report.pdf.
Phillips P.J., et al., "FRVT 2006 and ICE 2006 Large-Scale Results", NIST IR 7408, Gaithersburg, NIST, 2006, Mar. 29, 2007, pp. 1-55.
Pinto A., et al., "Video-Based Face Spoofing Detection through Visual Rhythm Analysis," Los Alamitos : IEEE Computer Society Conference Publishing Services, 2012, Conference on Graphics, Patterns and Images, 8 pages. (SIBGRAPI). Retrieved from the Internet: URL: http://sibgrapi.sid.inpe.br/rep/sid.inpe.br/sibgrapi/2012/07.13.21.16?mirror=sid.inpe.br/ banon/2001/03.30.15.38.24&metadatarepository=sid.inpe.br/sibgrapi/2012/07.13.21.1 6.53.
Quinn G.W., et al., "Performance of Face Recognition Algorithms on Compressed Images", NIST Inter Agency Report 7830, NIST, Dec. 4, 2011, 35 pages.
Ratha N.K., et al., "An Analysis of Minutiae Matching Strength," Audio- and Video-Based Biometric Person Authentication, Springer Berlin Heidelberg, 2001, 7 pages.
Ratha N.K., et al., "Enhancing Security and Privacy in Biometrics-Based Authentication Systems," IBM Systems Journal, 2001, vol. 40 (3), pp. 614-634.
Requirement for Restriction/Election from U.S. Appl. No. 14/218,504 dated Aug. 16, 2016, 11 pages.
Roberts C., "Biometric Attack Vectors and Defences," Sep. 2006, 25 pages. Retrieved from the Internet: URL: http://otago.ourarchive.ac.nz/bitstream/handle/10523/1243/BiometricAttackVectors.pdf.
Rocha A., et al., "Vision of the Unseen: Current Trends and Challenges in Digital Image and Video Forensics," ACM Computing Surveys, 2010, 47 pages. Retrieved from the Internet: URL: http://www.wjscheirer.com/papers/wjscsur2011forensics.pdf.
Rodrigues R.N., et al., "Robustness of Multimodal Biometric Fusion Methods Against Spoof Attacks," Journal of Visual Language and Computing. 2009. 11 pages, doi:10.1016/j.jvlc.2009.01.010; Retrieved from the Internet: URL: http://cubs.buffalo.edu/govind/papers/visual09.pdf.
Ross A., et al., "Multimodal Biometrics: An Overview," Proceedings of 12th European Signal Processing Conference (EUSIPCO), Sep. 2004, pp. 1221-1224. Retrieved from the Internet: URL: http://www.csee.wvu.edu/-ross/pubs/RossMultimodaiOverview EUSIPC004.pdf.
Schneier B., Biometrics: Uses and Abuses. Aug. 1999. Inside Risks 110 (CACM 42, Aug. 8, 1999), Retrieved from the Internet: URL: http://www.schneier.com/essay-019.pdf, 3 pages.
Schuckers, "Spoofing and Anti-Spoofing Measures," Information Security Technical Report, 2002, vol. 2002, pp. 56-62.
Schwartz et al., "Face Spoofing Detection Through Partial Least Squares and Low-Level Descriptors," International Conference on Biometrics, 2011, vol. 2011, pp. 1-8.
Smiatacz M., et al., Gdansk University of Technology. Liveness Measurements Using Optical Flow for Biometric Person Authentication. Metrology and Measurement Systems. 2012, vol. XIX, 2. pp. 257-268.
Supplementary Partial European Search Report for Application No. 13867269, dated Aug. 3, 2016, 7 pages.
T. Weigold et al., "The Zurich Trusted Information Channel—An Efficient Defence against Man-in-the-Middle and Malicious Soft-

(56) References Cited

OTHER PUBLICATIONS ware Attacks," P. Lipp, A.R. Sadeghi, and K.M. Koch, eds., Proc. Trust Conf. (Trust 2008), LNCS 4968, Springer-Verlag, 2008, pp. 75-91.
Chen L., "Direct Anonymous Attestation," Oct. 12, 2005, retrieved from https://trustedcomputinggroup.org/wp-content/uploads/051012_DAA-slides.pdf on Apr. 2, 2018, 27 pages.
Communication pursuant to Rules 70(2) and 70a(2) EPC for Application No. 15827363.7, dated Mar. 13, 2018, 1 page.
Communication pursuant to Rules 70(2) and 70a(2) EPC for European Application No. 15786487.7, dated Nov. 9, 2017, 1 page.
Corrected Notice of Allowance from U.S. Appl. No. 14/066,273, dated Feb. 8, 2018, 4 pages.
Extended European Search Report for Application No. 15826364.0, dated Feb. 20, 2018, 6 pages.
Extended European Search Report for Application No. 15827363.1, dated Feb. 22, 2018, 7 pages.
Extended European Search Report for Application No. 15828152.7, dated Feb. 20, 2018, 8 pages.
Extended European Search Report for Application No. 15841530.7, dated Mar. 26, 2018, 8 pages.
Final Office Action from U.S. Appl. No. 14/218,677, dated May 31, 2018, 16 pages.
Final Office Action from U.S. Appl. No. 14/218,611, dated May 3, 2018, 20 pages.
Final Office Action from U.S. Appl. No. 14/218,743, dated Feb. 7, 2018, 27 pages.
Final Office Action from U.S. Appl. No. 15/396,452, dated Feb. 27, 2018, 24 pages.
Final Office Action from U.S. Appl. No. 15/595,460, dated Jan. 11, 2018, 19 pages.
Kim et al., "Secure User Authentication based on the Trusted Platform for Mobile Devices," EURASIP Journal on Wireless Communications and Networking, Sep. 29, 2016, pp. 1-15.
Niinuma K., et al., "Continuous User Authentication Using Temporal Information," Apr. 2010, http://www.cse.msu.edu/biometrics/Publications/Face/NiinumaJain_ContinuousAuth_SPIE10.pdf, 11 pages.
Non-Final Office Action from U.S. Appl. No. 14/145,466, dated May 11, 2018, 33 pages.
Non-Final Office Action from U.S. Appl. No. 14/268,563, dated Jun. 28, 2018, 56 pages.
Non-Final Office Action from U.S. Appl. No. 15/881,522, dated Jun. 6, 2018, 87 pages.
Non-Final Office Action from U.S. Appl. No. 14/218,575, dated Mar. 8, 2018, 29 pages.
Non-Final Office Action from U.S. Appl. No. 14/218,646, dated Mar. 7, 2018, 32 pages.
Non-Final Office Action from U.S. Appl. No. 14/218,677, dated Feb. 2, 2018, 25 pages.
Non-Final Office Action from U.S. Appl. No. 15/229,254, dated Feb. 14, 2018, 75 pages.
Non-Final Office action from U.S. Appl. No. 15/595,460, dated May 3, 2018, 20 pages.
Notice of Allowance from U.S. Appl. No. 14/448,814, dated May 9, 2018, 42 pages.
Notice of Allowance from U.S. Appl. No. 15/396,452, dated Jul. 2, 2018, 23 pages.
Notice of Allowance from U.S. Appl. No. 14/066,273, dated Jan. 18, 2018, 26 pages.
Notice of Allowance from U.S. Appl. No. 14/218,504, dated May 31, 2018, 95 pages.
Notice of Allowance from U.S. Appl. No. 14/859,328, dated Feb. 1, 2018, 18 pages.
Notification for Granting Patent Right and Search Report from foreign counterpart Chinese Patent Application No. 201380068869.3, dated May 4, 2018, 10 pages.
Notification of Reason for Rejection from foreign counterpart Japanese Patent Application No. 2016-505506, dated Feb. 13, 2018, 6 pages.
Notification of Reasons for Rejection from foreign counterpart Japanese Patent Application No. 2016-0516743, dated Apr. 23, 2018, 12 pages.
Office Action and Search Report from foreign counterpart Taiwan Patent Application No. 106125986, dated Mar. 19, 2018, 6 pages.
Office Action from foreign counterpart Japanese Patent Application No. 2015-550778, dated Feb. 7, 2018, 14 pages.
Corrected Notice of Allowance from U.S. Appl. No. 15/396,452, dated Aug. 30, 2018, 17 pages.
Decision to Grant from foreign counterpart Japanese Patent Application No. 2015-550778, dated Jul. 25, 2018, 6 pages.
Final Office Action from U.S. Appl. No. 15/229,254, dated Aug. 23, 2018, 16 pages.
Final Office Action from U.S. Appl. No. 14/218,575 dated Sep. 5, 2018, 19 pages.
Final Office Action from U.S. Appl. No. 14/218,646, dated Aug. 9, 2018, 23 pages.
Non-Final Office Action from U.S. Appl. No. 15/954,188, dated Sep. 7, 2018, 41 pages.
Notice of Allowance from foreign counterpart Chinese Patent Application No. 201480031042.X, dated Jul. 23, 2018, 5 pages.
Notice of Allowance from foreign counterpart Taiwan Patent Application No. 106125986, dated Jul. 6, 2018, 7 pages.
Notice of Allowance from U.S. Appl. No. 14/218,743, dated Aug. 1, 2018, 18 pages.
OASIS Standard, "Authentication Context for the OASIS Security Assertion Markup Language (SAML) V2.0," Mar. 15, 2005, 70 pages.
"OpenID Connect Core 1.0—draft 17," Feb. 3, 2014, 70 pages.
Watanabe H., et al., "The Virtual Wearable Computing System Assumed Widely Movement," the multimedia, distribution and cooperation which were taken into consideration, mobile (DICOMO2009) symposium collected-papers [CD-ROM], Japan, Information Processing Society of Japan, Jul. 1, 2009, and vol. 2009 (1), pp. 1406-1414. (Abstract only in English).

* cited by examiner

SYSTEM AND METHOD FOR DELEGATING TRUST TO A NEW AUTHENTICATOR

CROSS REFERENCE TO RELATED APPLICATIONS

This application claims the benefit of and priority to U.S. Provisional Patent Application No. 61/804,568, filed, Mar. 22, 2013, entitled, "Advanced Methods of Authentication And Its Applications".

BACKGROUND

Field of the Invention

This invention relates generally to the field of data processing systems. More particularly, the invention relates to a system and method for delegating trust to a new authenticator.

Description of Related Art

FIG. 1 illustrates an exemplary client 120 with a biometric device 100. When operated normally, a biometric sensor 102 reads raw biometric data from the user (e.g., capture the user's fingerprint, record the user's voice, snap a photo of the user, etc) and a feature extraction module 103 extracts specified characteristics of the raw biometric data (e.g., focusing on certain regions of the fingerprint, certain facial features, etc). A matcher module 104 compares the extracted features 133 with biometric reference data 110 stored in a secure storage on the client 120 and generates a score based on the similarity between the extracted features and the biometric reference data 110. The biometric reference data 110 is typically the result of an enrollment process in which the user enrolls a fingerprint, voice sample, image or other biometric data with the device 100. An application 105 may then use the score to determine whether the authentication was successful (e.g., if the score is above a certain specified threshold).

While the system shown in FIG. 1 is oriented towards biometric authentication, various other or additional authentication techniques may be employed on the exemplary client 120. For example, the client-side authenticators may be based on a PIN or other secret code (e.g., a password) entered by the user and/or may be triggered based on user presence (e.g., a button that user pushes to verify presence).

Systems have been designed for providing secure user authentication over a network using biometric sensors. In such systems, the score generated by the application, and/or other authentication data, may be sent over a network to authenticate the user with a remote server. For example, Patent Application No. 2011/0082801 ("'801 application") describes a framework for user registration and authentication on a network which provides strong authentication (e.g., protection against identity theft and phishing), secure transactions (e.g., protection against "malware in the browser" and "man in the middle" attacks for transactions), and enrollment/management of client authentication tokens (e.g., fingerprint readers, facial recognition devices, smartcards, trusted platform modules, etc).

The assignee of the present application has developed a variety of improvements to the authentication framework described in the '801 application. Some of these improvements are described in the following set of US patent applications ("Co-pending applications"), all filed Dec. 29, 1012, which are assigned to the present assignee and incorporated herein by reference: Ser. No. 13/730,761, Query System and Method to Determine Authentication Capabilities; Ser. No. 13/730,776, System and Method for Efficiently Enrolling, Registering, and Authenticating With Multiple Authentication Devices; Ser. No. 13/730,780, System and Method for Processing Random Challenges Within an Authentication Framework; Ser. No. 13/730,791, System and Method for Implementing Privacy Classes Within an Authentication Framework; Ser. No. 13/730,795, System and Method for Implementing Transaction Signaling Within an Authentication Framework.

Briefly, the Co-Pending applications describe authentication techniques in which a user enrolls with biometric devices of a client to generate biometric template data (e.g., by swiping a finger, snapping a picture, recording a voice, etc); registers the biometric devices with one or more servers over a network (e.g., Websites or other relying parties equipped with secure transaction services as described in the Co-Pending applications); and subsequently authenticates with those servers using data exchanged during the registration process (e.g., encryption keys provisioned into the biometric devices). Once authenticated, the user is permitted to perform one or more online transactions with a Website or other relying party. In the framework described in the Co-Pending applications, sensitive information such as fingerprint data and other data which can be used to uniquely identify the user, may be retained locally on the user's client device (e.g., smartphone, notebook computer, etc) to protect a user's privacy.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Figure 1:
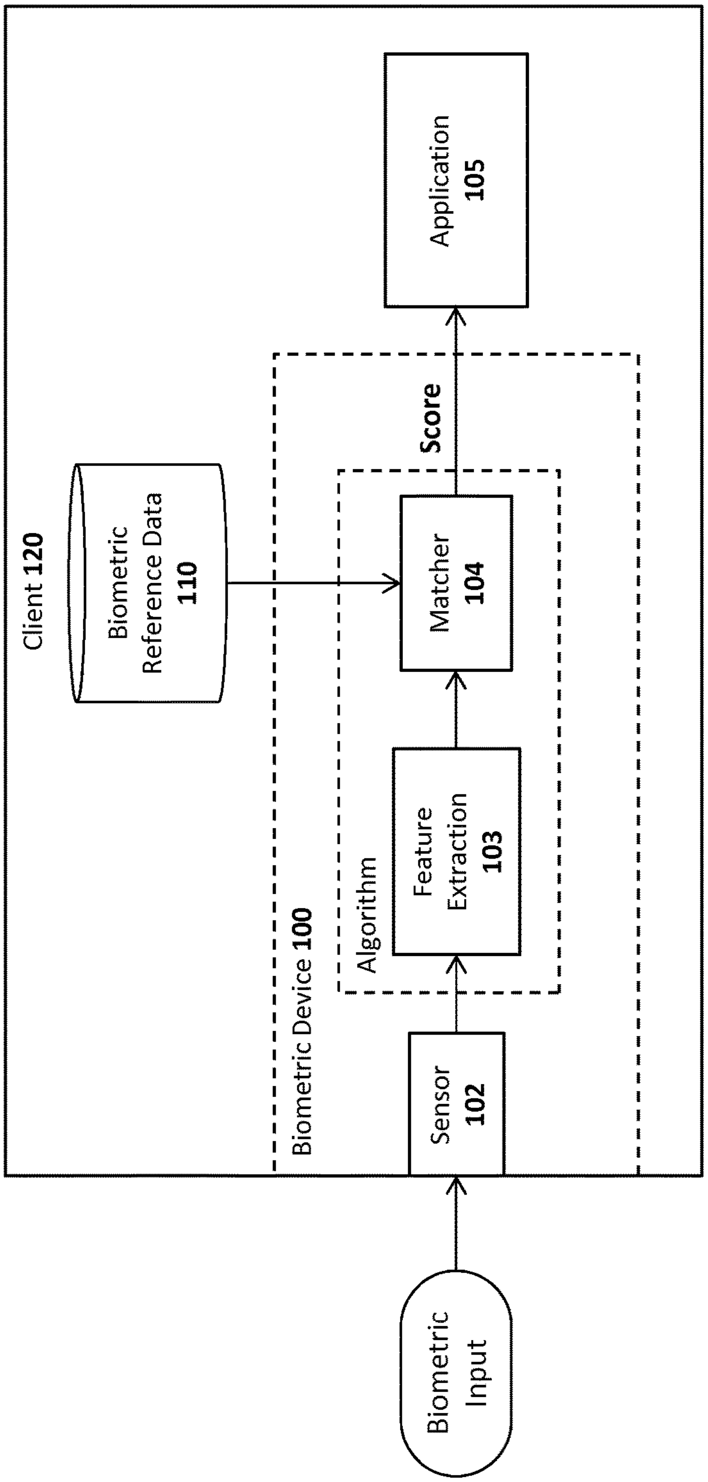
FIG. 1 illustrates an exemplary client equipped with a biometric device.

Described below are embodiments of an apparatus, method, and machine-readable medium for delegating trust to a new authenticator. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are not shown or are shown in a block diagram form to avoid obscuring the underlying principles of the present invention.

The embodiments of the invention discussed below involve client devices with authentication capabilities such as biometric devices or PIN entry. These devices are sometimes referred to herein as "tokens," "authentication devices," or "authenticators." While certain embodiments focus on facial recognition hardware/software (e.g., a camera and associated software for recognizing a user's face and tracking a user's eye movement), some embodiments may utilize additional biometric devices including, for example, fingerprint sensors, voice recognition hardware/software (e.g., a microphone and associated software for recognizing a user's voice), and optical recognition capabilities (e.g., an optical scanner and associated software for scanning the retina of a user). The authentication capabilities may also include non-biometric devices such as trusted platform modules (TPMs) and smartcards.

In a mobile biometric implementation, the biometric device may be remote from the relying party. As used herein, the term "remote" means that the biometric sensor is not part of the security boundary of the computer it is communicatively coupled to (e.g., it is not embedded into the same physical enclosure as the relying party computer). By way of example, the biometric device may be coupled to the relying party via a network (e.g., the Internet, a wireless network link, etc) or via a peripheral input such as a USB port. Under these conditions, there may be no way for the relying party to know if the device is one which is authorized by the relying party (e.g., one which provides an acceptable level of authentication and integrity protection) and/or whether a hacker has compromised the biometric device. Confidence in the biometric device depends on the particular implementation of the device.

The term "relying party" is sometimes used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement.

The term "server" is used herein to refer to software executed on a hardware platform (or across multiple hardware platforms) that receives requests over a network from a client, responsively performs one or more operations, and transmits a response to the client, typically including the results of the operations. The server responds to client requests to provide, or help to provide, a network "service" to the clients. Significantly, a server is not limited to a single computer (e.g., a single hardware device for executing the server software) and may, in fact, be spread across multiple hardware platforms, potentially at multiple geographical locations.

Embodiments for User Confirmation for Online Transactions

There are various scenarios where completing a transaction with a relying party may require approval from one or more other users. By way of example, and not limitation, a parent may want to approve a financial transaction initiated by a child, a commander may need to approve a transaction initiated by a soldier, a manager may need to approve a business transaction initiated by an employee, and a cryptographic key management system may require multiple users to approve a particular transaction before it can be committed.

Figure 2:
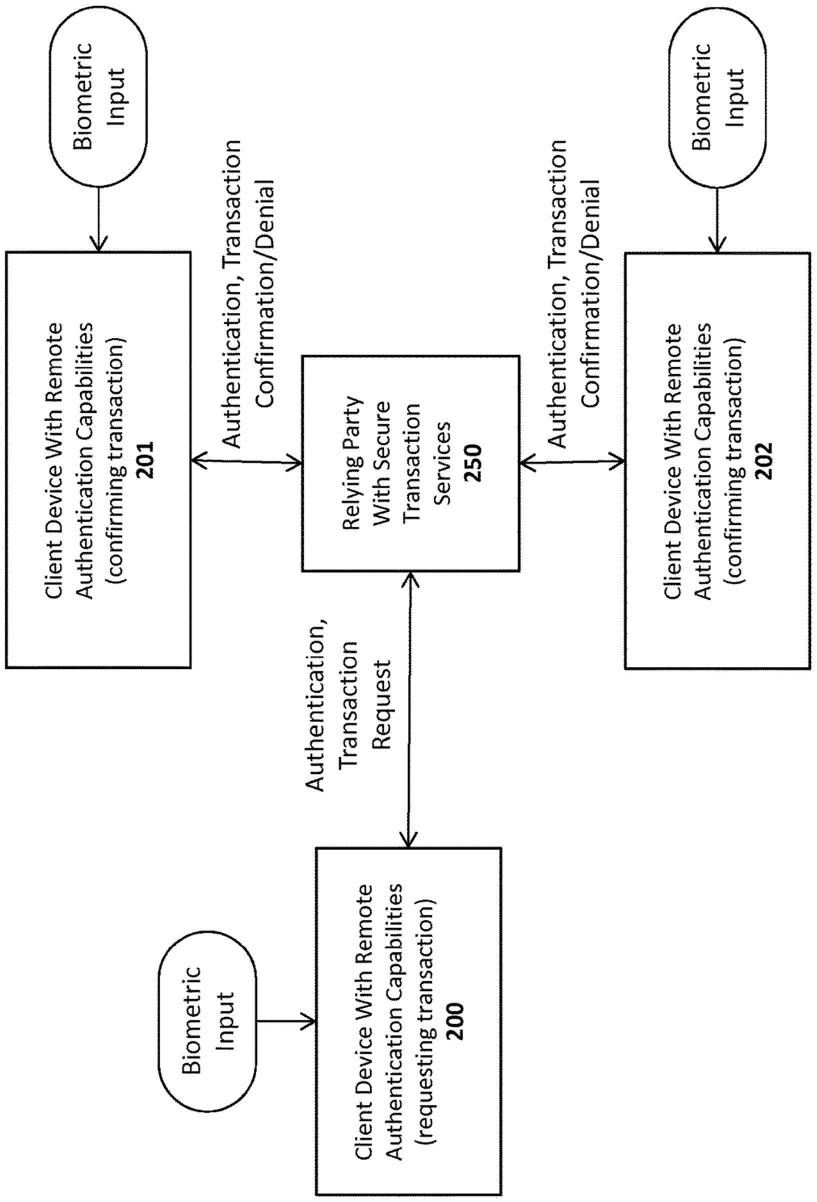
FIG. 2 illustrates one embodiment of a system for user confirmation of online transactions.

One embodiment of the invention uses the techniques described herein for providing strong authentication of users over a network to enable multi-user confirmation applications. One such example is illustrated in FIG. 2 which shows a client device with remote authentication capabilities 200 controlled by a user attempting to initiate a transaction with a relying party with secure transaction services 250 (hereinafter simply referred to as "relying party"). In one embodiment, the user of client device 200 authenticates with the relying party 250 using one or more of the remote authentication techniques described herein (e.g., providing biometric input such as swiping a finger on a fingerprint sensor, entering a PIN or password, etc).

In the illustrated embodiment, other client devices 201-202 have users who are registered with the relying party as "approvers" for the user of client device 200. Thus, for certain types of transactions (e.g., financial transactions involving amounts over a specified threshold), the relying party may require approval from the users of client devices 201-202. As discussed below, the remote authentication techniques described herein are employed as part of the approval process.

In one embodiment, in response to a successful authentication by the user of client device 200, notification generation logic at the relying party 250 sends a notification the other client devices 201-202 with users registered as "approvers" indicating that the user of client device 200 is attempting to complete a transaction. The notification may be sent in a variety of ways in accordance with the underlying principles of the invention. For example, if the client devices 201-202 are mobile devices, then a push notification may be sent to the client devices 201-202. Alternatively, or in addition, the notification may be sent via email, text message (e.g., SMS), instant message, or any other technology capable of delivering a message to the client devices 201-202.

In one embodiment, the notification includes details of the transaction being attempted by the user of client device 200. For example, if the transaction is a financial transaction, then the notification may include the particular amount of money being processed and the type of financial transaction being performed (e.g., withdrawal, transfer between accounts, etc). Alternatively, the notification may include a link such as a hyperlink or other type of pointer directing the users of client devices 201-202 to an approval service on the relying party. Upon selection of the link, the users of client devices 201-202 may be provided with details of the transaction (e.g., in a Web page or other useful format for providing information).

In one embodiment, upon responding to the notifications and reviewing the details of the transaction, the users of client devices 201-202 may confirm the request by performing remote authentication with the relying party (e.g., using the multi-factor authentication techniques described herein) and indicating an approval of the transaction.

Figure 3:
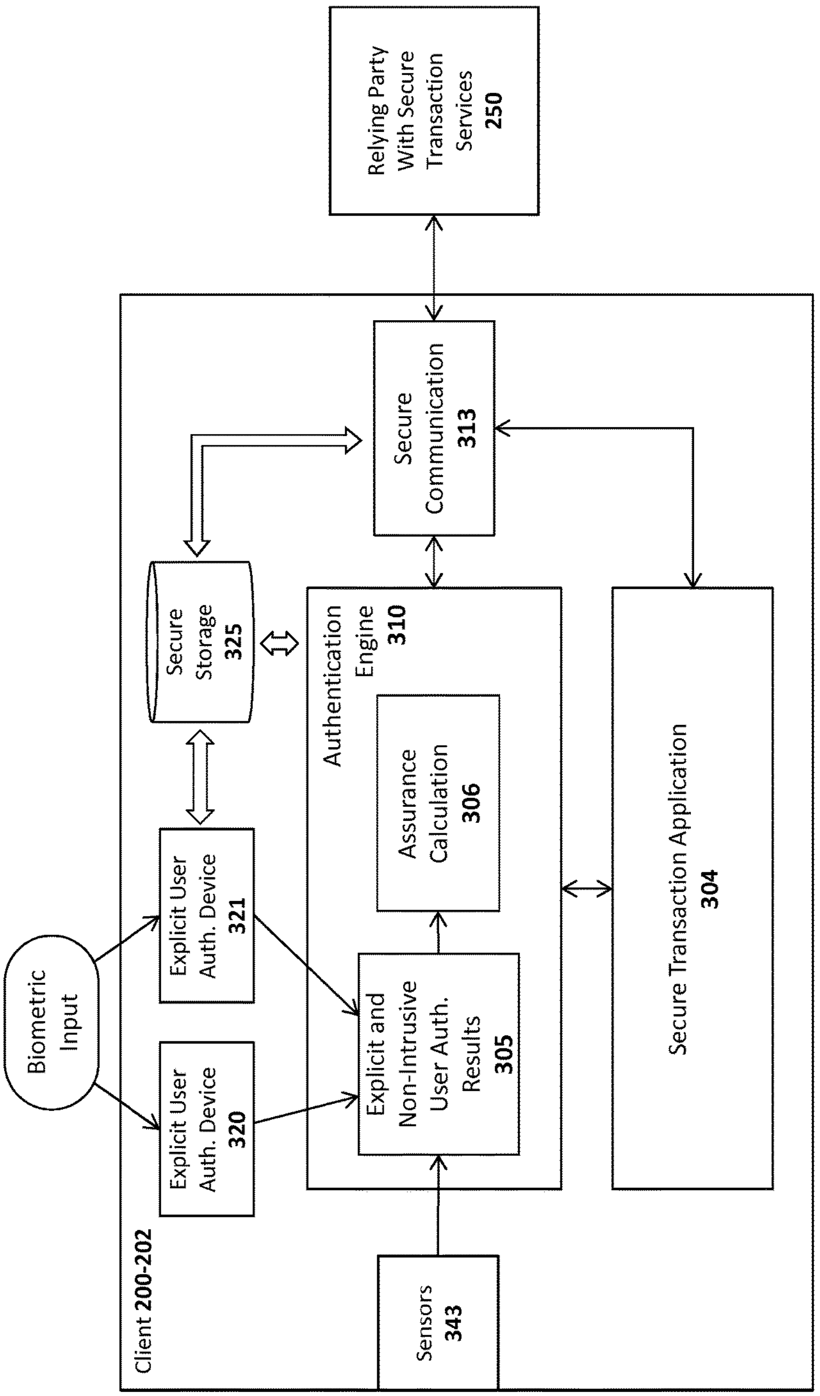
FIG. 3 illustrates details of one embodiment of a client used in a system for user confirmation of online transactions.

Additional architectural details of a client device 200-202 employed in one embodiment of the invention are illustrated in FIG. 3. In particular, the client devices 200-202 of this embodiment includes a secure transaction application 304 for communicating with the relying party 250 and coordinating the transaction approval techniques described herein. The secure transaction application 304 may be a stand-alone application which interfaces with the authentication engine 310 via a secure application programming interface (API). Alternatively, the secure transaction application 304 may be implemented as a mobile device app or a Web browser plugin.

In addition to coordinating the user confirmation process described herein, in one embodiment, the secure transaction application 304 ensures that the text displayed to each user is the actual text related to the transaction. For example, the application 304 may display text within a secure window and ask the user to provide authentication to confirm the transaction. The application may initiate a timer and periodically verify the content of the current window being displayed to the user (e.g., by generating a signature on the content). The period of verification may be randomly chosen. Thus, the application continually ensures that each user sees the valid transaction details in the window (thereby ensuring that the transaction text has not been modified by a "man in the middle" attack). If the application detects that the content has been tampered with it prevents the confirmation of the transaction from being generated.

In one embodiment, after the a user provides valid authentication (e.g., swipes a finger on the fingerprint sensor), the client device identifies the user and generates a token (cryptographic signature) with the transaction details (e.g., the displayed text) and a random challenge provided from the relying party (e.g., the token may be a signature over the transaction details and a nonce). This allows the relying party 250 ensure that the transaction details have not been modified between the server and the client. In one embodiment, the application 304 sends the generated token and username to the relying party, which then identifies the user with the username and verifies the token. If verification succeeds, a confirmation message is sent to the client and the transaction is processed.

The above techniques may be implemented for both the transaction request/confirmation originating from the client device 200 and for the approval transactions originating from the users of client devices 201-202.

Returning to FIG. 3, in one embodiment, authentication may be performed via an authentication engine 310 on the client devices 200-202 designed to perform a series of transactions with the relying party 250 to remotely authenticate each user. For example, as described in the co-pending applications an authentication framework and associated authentication techniques may be employed in which a user enrolls with biometric devices 320-321 of a client to generate biometric template data (e.g., by swiping a finger, snapping a picture, recording a voice, etc); registers the biometric devices with one or more relying parties 250 over a network (e.g., Websites or other relying parties equipped with secure transaction services); and subsequently authenticates with those relying parties 250 using data exchanged during the registration process (e.g., encryption keys provisioned into the biometric devices). In one embodiment, "registration" with relying parties includes exchanging symmetric or asymmetric keys with the relying party for each user authentication device 320-321 and storing the keys within a secure storage 325 associated with each authentication devices 320-321. A secure key provisioning protocol such as the Dynamic Symmetric Key Provisioning Protocol (DSKPP) may be used to share keys with the client over a secure communication channel (see, e.g., Request for Comments (RFC) 6063). However, the underlying principles of the invention are not limited to any particular key provisioning protocol.

During the authentication phase, the keys are used, for example, to generate signatures, verify signatures, and/or encrypt communication between the clients 200-202 and the relying party 250. Once authenticated, the user is permitted to perform one or more online transactions. In addition, in one embodiment, sensitive information such as fingerprint data and other data which may uniquely identify the user may be retained locally on the user's client device (e.g., smartphone, notebook computer, etc) to protect the user's privacy.

In one embodiment, the authentication engine 310 includes an assurance level calculation module 306 for calculating an assurance level corresponding to a likelihood that the legitimate user is in possession of the client device 200-202. It may then use this assurance level to determine whether the relying party 250 should authorize a current transaction. In one embodiment, the relying party 250 may specify the level of assurance required for a given transaction. For example, for a financial transaction involving the transfer of a significant amount of money, the relying party 250 may require a relatively higher assurance level than, for example, a transaction involving no exchange of money or mere access to a user information.

In one embodiment, the assurance level calculation module 306 transmits the assurance level (e.g., specified as a value, percentage, code, etc) to the relying party 250, without disclosing any confidential user information, thereby protecting the user's privacy. In another embodiment, the assurance level calculation module 306 knows the assurance level required for the current transaction, determines whether the assurance level is sufficiently high, and transmits an indication of whether the transaction is permitted or denied to the relying party 250 (without disclosing the user's private information to the relying party 250).

In one embodiment, the communication between the client devices 200-202 and relying party 250 is secured via a secure communication module 313, which may encrypt outgoing communication using a first key and decrypt incoming communication using a second key. In a symmetric key encryption scheme the first and second keys are the same. In an asymmetric key encryption scheme, the keys are different. However, the underlying principles of the invention are not limited to any particular type of encryption.

In one embodiment, the assurance level calculation module 306 determines the assurance level based, at least in part, on current user authentication results 305 which may include the results of a current or recent explicit user authentication via one or more explicit user authentication devices 320-321. This may include, for example, fingerprint authentication via a fingerprint device, facial recognition authentication via a camera and facial recognition hardware/software, voice recognition via a microphone and voice recognition hardware/software, retinal scanning using a camera and associated hardware/software, a password/PIN entry by the end user via a keypad, and/or various other types of explicit user authentication devices and/or techniques.

In one embodiment, the secure storage 325 cryptographically protects the biometric reference data records for each user authentication device 320-321 (e.g., wrapping the data using a symmetric key to make the storage 325 secure). While the secure storage 325 is illustrated outside of the secure perimeter of the authentication device(s) 320-321, in one embodiment, each authentication device 320-321 may have its own integrated secure storage to cryptographically protect the biometric reference data records.

In addition to explicit user authentication, one embodiment of the authentication engine 310 performs non-intrusive authentication by collecting data from sensors 343 to be used by the assurance calculation module 306 to generate the assurance level. By way of example, the sensors 343 may include location sensors such as GPS sensors to indicate a current location of the user. If the client devices 200-202 are in an expected location such as the known vicinity (e.g., a "home" or "office" location), then this increases the likelihood that the user is the legitimate user. By contrast, if the GPS reading indicates that the user is not at an expected location, then this indicates that the user initiating the transaction is not the legitimate user. Thus, in one embodiment, the assurance calculation module 306 will increase the assurance level if the user is in an expected location and decrease the assurance level if the user is in an unexpected location.

Various additional sensors 343 such as temperature sensors, humidity sensors and accelerometers may be used to collect data relevant to user authentication. For example, the temperature/humidity sensors may provide a current temperature/humidity which may be compared against the known temperature/humidity for the location specified by the location sensor. If the values are significantly different, then this may indicate that the client devices 200-202 are being spoofed. The comparison of the asserted location and the temperature/humidity may be done at a remote server such as the secure transaction server(s) used by the relying party 250. In another embodiment, accelerometers on the device may be used to measure the gait of the user and compare these measurements against the known gait of the user. If the gaits match (within a specified threshold), then this increases the likelihood that the legitimate user is in possession of the client device 200-202.

Another non-intrusive authentication technique comprises measuring an amount of time which has elapsed since the last successful user authentication. For example, if the user has very recently performed an explicit user authentication (e.g., swiping a finger on a fingerprint reader just a few minutes earlier), then this will tend to indicate that the legitimate user is still in possession of the client device (thereby resulting in a high baseline assurance level). By contrast, if the last explicit authentication has been several hours or several days earlier, then a new explicit user authentication may be required to reach an acceptable assurance level.

Figure 4:
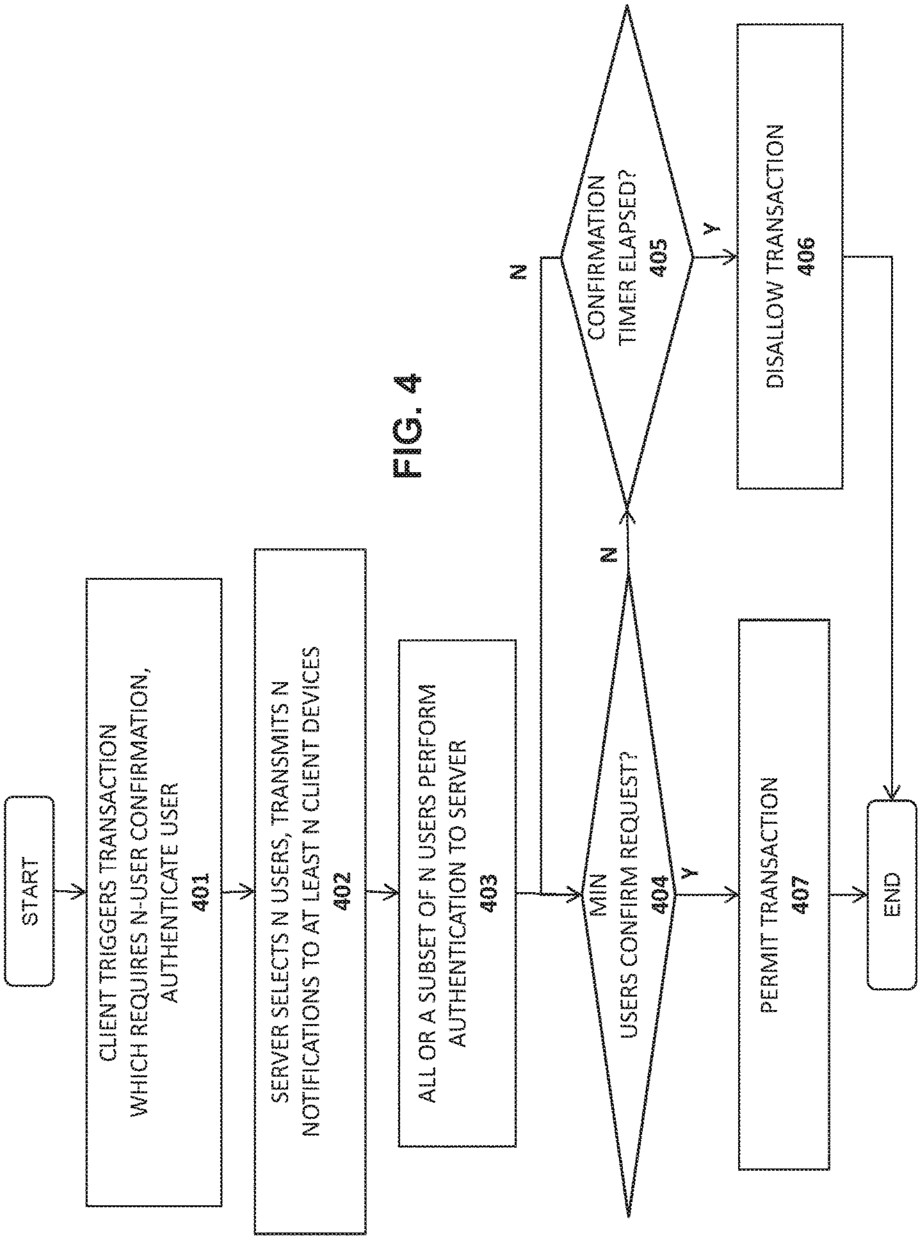
FIG. 4 illustrates one embodiment of a method for user confirmation of online transactions.

A method in accordance with one embodiment of the invention is illustrated in FIG. 4. At 401, the user of a client triggers a transaction which requires a confirmation by N other users. For example, the user's account at the relying party may indicate that certain types of transactions initiated by the user (or all transactions) require confirmation by one or more other users. For example, the user's account may identify the user as a minor, requiring authorization by one or more parents or guardians. The user is also authenticated at 401 by implementing one or more of the authentication techniques described herein.

At 402, the server selects N other users who must confirm the transaction triggered by the user. For example, upon detecting the initiation of the transaction by the user, the relying party may query its user database to determine that the transaction requires confirmation and the identity of the users who can confirm the transaction. In one embodiment, a subset of all of the users who are capable of confirming the transaction may actually confirm the transaction. For example, if the user is a minor with two parents then, in one embodiment, the notification may be sent to both parents, but a confirmation by either parent will allow the transaction to proceed. Similarly, there may be 10 users who are authorized to confirm a business transaction, but only 2 confirmations are required to allow the transaction to proceed.

In one embodiment, a push notification may be sent to the client devices of those users who can confirm the transaction (e.g., if the users have client devices capable of receiving push notifications). Alternatively, or in addition, the notification may be sent via email, text message (e.g., SMS), instant message, or any other technology capable of delivering a message to the client devices. In one embodiment, a user may be registered with the server to receive confirmation messages through two or more communication channels. For example, a user may receive both a push notification and an email containing the confirmation request.

Regardless of how the confirmation request is sent, at 403 all or a subset of the N users perform authentication with the server as part of the confirmation process. Any remote authentication techniques may be employed to authenticate the users and confirm the transaction. For example, a user may confirm a transaction by providing biometric data to a biometric device on the client which has been previously registered with the relying party (e.g., swiping a finger on a fingerprint scanner). As mentioned above, the details associated with the transaction may be provided to the users via a secure transaction application capable of securely displaying text and other information (i.e., ensuring that when a user confirms the transaction, he/she has viewed the actual, unaltered text describing the transaction).

Once a minimum specified number of users have confirmed the request, determined at 404, then the transaction is permitted at 407. One embodiment of the method starts a confirmation timer to measure the amount of elapsed time since the confirmation requests were sent. Once the confirmation timer has reached a threshold value (e.g., a few hours, a day, etc.), determined at 405, the transaction is disallowed at 406. Until the timer threshold is reached, the method waits at 404 for the minimum specified number of users to confirm the request.

System and Method for Delegating Trust Between Client Devices

Existing authentication systems do not allow new authenticators to be enabled using registered authenticators on trusted clients. For example, if a user has a fingerprint sensor on her phone which she has registered with number of websites and then she installs a voice authenticator on her phone, she has no way to automatically register her voice authenticator with all the websites she was using with fingerprint sensor. Rather, in this case, the user must step through the same enrollment and registration process to register the voice authenticator with the relying party. Similarly, if the user purchases a new device with a new set of authenticators, the user must re-enroll and reregister all of the new authenticators with the server.

The embodiments of the invention described below allow a user to easily enable and register the authenticator(s) on a new client device using a trusted client device that is already enabled and registered with one or more relying parties. In particular, these embodiments may be used to enable new authenticators, enable new client devices, and keep the registrations in sync between multiple client devices.

Figure 5:
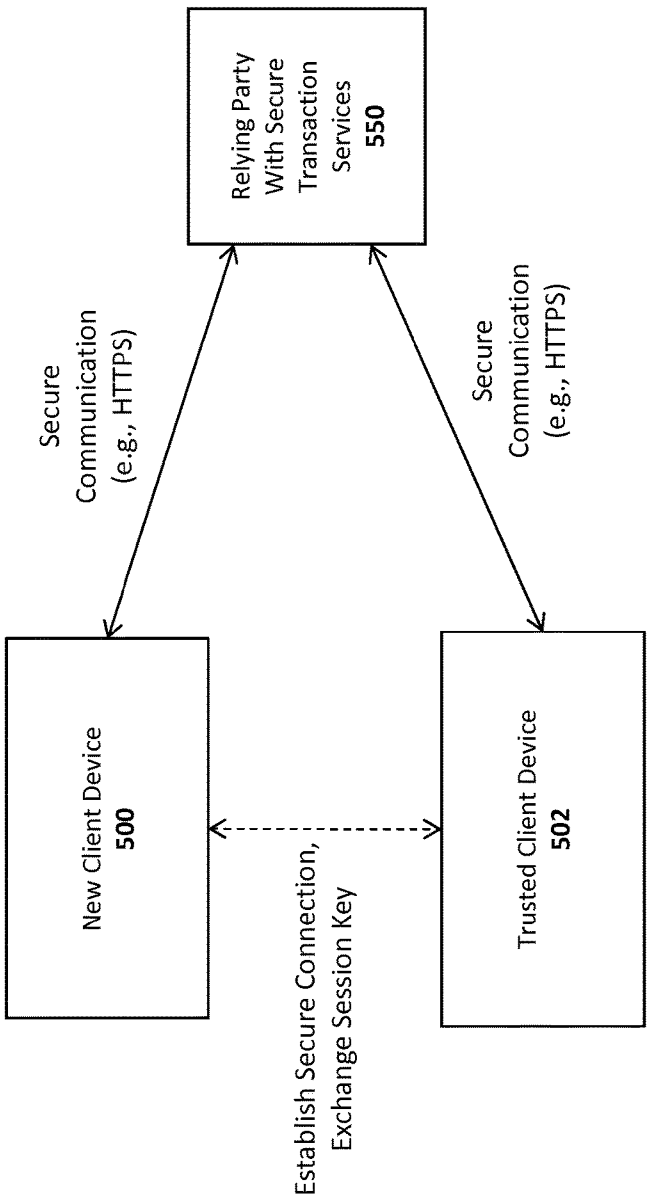
FIG. 5 illustrates one embodiment of a system for delegating trust to a new client device from a trusted client device.

FIG. 5 provide a high level overview of trust delegation in accordance with one embodiment of the invention. A trusted device 502, i.e., a device which has an authenticator which is registered with one or more relying parties 550, establishes a secure connection with the user's new client device 500. The particular manner in which the secure connection is established is not pertinent to the underlying principles of the invention. Various techniques may be used such as near field communication (NFC), Bluetooth, Wifi Direct, using a quick response (QR) code and establishing an HTTPS connection. In one embodiment, the devices may exchange a large random token (LRT) needed for a secure connection and may establish a connection by providing the captured LRT to an online service and bootstrap a secure communication via the service.

In one embodiment, once the secure connection is established between the trusted client device 502 and new client device 500, a secure protocol is implemented (described in detail below) to transfer and integrate the registration data from the trusted device to the new device. Once the registrations have been transferred, another secure protocol is implemented (e.g., HTTPS in one embodiment) between the new client device 500 and relying parties 550 to verify the registrations.

While the embodiments described herein focus on transferring authentication data used for authentication transactions with a relying party 550, the relying party may not be required for complying with the underlying principles of the invention. For example, the trusted device 502 may establish a secure connection to provide authentication data to the new client device 500 without any relying party involved in the system (e.g., to provide authentication data for authenticating locally with the new client device 500).

Figure 6:
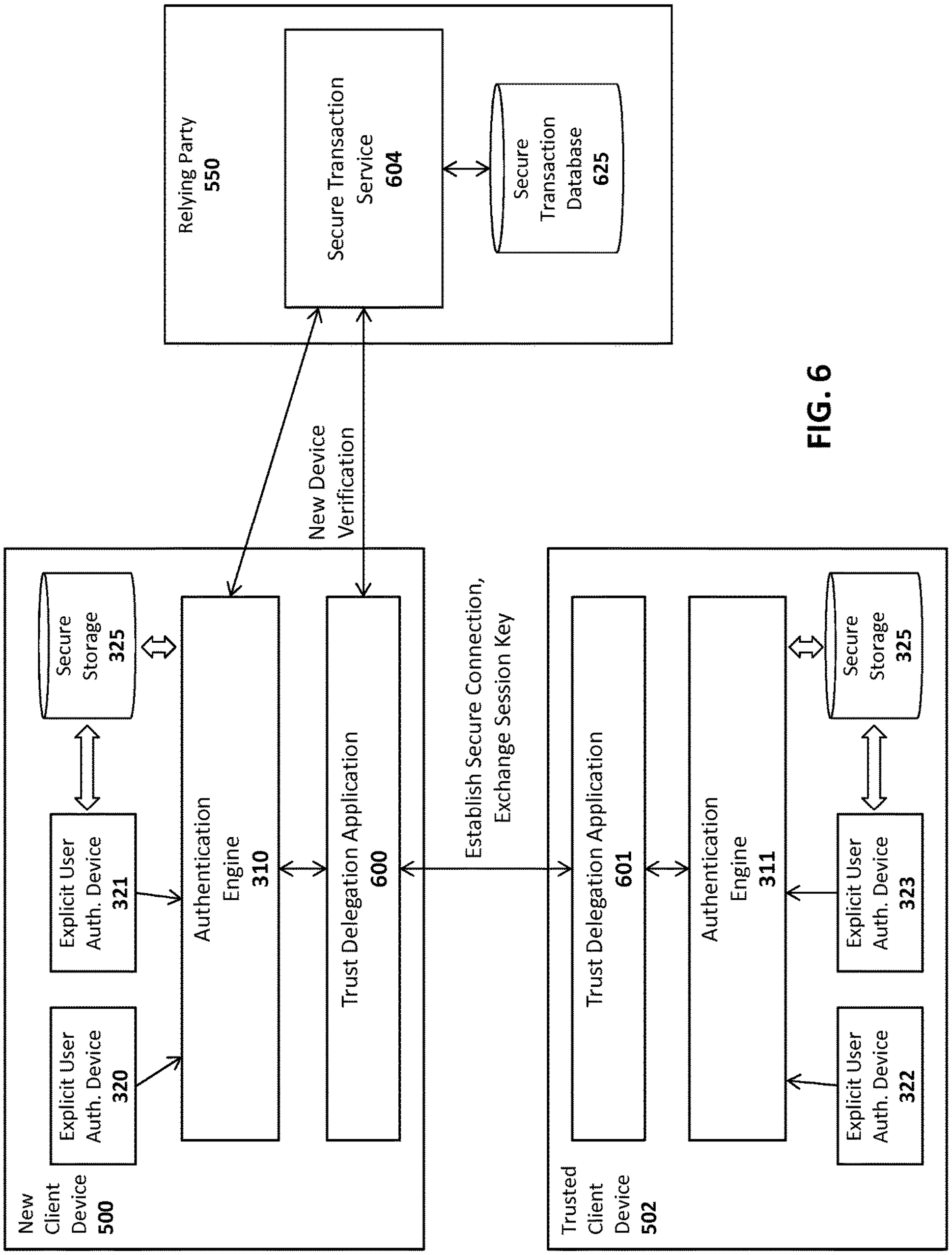
FIG. 6 illustrates additional details for one embodiment of a system for delegating trust to a new client device from a trusted client device.

As illustrated in FIG. 6, a trust delegation module 600-601 may be executed on the new device 500 and trusted device 502, respectively, to establish the secure connection, exchange the registrations, and verify the registrations with a secure transaction service 604 on each relying party 550. As used herein, a "trusted authenticator" is an authenticator that a user has already registered with one or more relying parties. A new "new authenticator" is one which the user wishes to enable with all the relying party registrations currently being used with the trusted authenticator. Thus, the authentication engine 311 is considered a trusted authenticator if it has previously registered one or more user authentication devices 320-321 with a relying party. The goal of one embodiment is to turn the authentication engine 310 of the new device 500 from a new authenticator into a trusted authenticator. A "trusted device" is one which has a trusted authenticator and a "new device" is one which has a new authenticator.

Trust delegation refers to the process of enabling the new authenticator using a trusted authenticator. Thus, the preconditions of trust delegation are: the user has a trusted device; the user has a new device; the user wants to delegate trust from trusted device to new device.

Returning to FIG. 6, in one embodiment, the user initiates the trust delegation application 600 on the new client device 500 and the trust delegation application 601 on the trusted client device to establish the initial secure connection. In one embodiment, the trust delegation applications may be mobile device apps, specifically designed to perform the trust delegation operations described herein. In another embodiment, the trust delegation applications may be browser plugins executed in response to the user indicating that he/she wishes to perform trust delegation (e.g., via a web page with embedded Javascript or other applet or executable program code). Moreover, the trust delegation applications 600-601 may be software modules within a larger application such as an authentication application designed to manage authentications with relying parties. It should be noted, however, that the underlying principles of the invention are not limited to any particular implementation of the trust delegation applications 600-601.

In one embodiment, to approve the trust delegation operations on the trusted device 502, the user locally authenticates with the authentication engine 311 on the trusted device (e.g., providing biometric input to a user authentication device 322-323). Similarly, in one embodiment, the user may locally authenticate with the authentication engine 310 on the new client device 500. These two authentication steps may provide authorization for the trust delegation applications 600-601 to perform the delegation process.

As mentioned, the trust delegation applications 600-601 may utilize any of the communication interfaces available on their respective client devices 500, 502 to establish a secure connection (e.g., Bluetooth interfaces for a Bluetooth connection, NFC interfaces for an NFC connection, etc).

Once the secure connection is established, in one embodiment, the trust delegation application 601 of the trusted client 502 provides data indicating the number of keys (N) on the trusted client which are registered with relying parties. In response, in one embodiment, the trust delegation application 600 generates N new device key pairs (ND_Uauth) including one private key (ND_Uauth.priv) and one public key (ND_Uauth.pub) and sends the N new device pubic keys to the trust delegation application 601 on the trusted device 502.

In one embodiment, the trust delegation application 601 then signs each of the N new device public keys with its corresponding trusted device private key (TD_Uauth.priv) to generate a signature (TD_Uauth.sig) associated with each of the N new device public keys. In one embodiment, the "corresponding" private key is the private key associated with a particular registration with a corresponding relying party. The trust delegation application 601 may also insert a timestamp into the generated signature which may subsequently be used by the relying party to verify exactly when the trust delegation occurred. In one embodiment, the trust delegation application 601 of the trusted client 502 then transmits each of the generated signatures along with other registration data associated with each relying party to the trust delegation application 600 on the new client 500. The data for each relying party may include, one or more relying party ID codes (e.g., application ID codes identifying services at the relying party), user names registered for the user at the relying party, key ID codes used by the relying party to locate the appropriate keys during authentication, and any other data relevant to the authentication process.

In one embodiment, once the trust delegation application 600 receives the signatures and other registration data, it integrates this data into the local secure storage device 325 so that it may be subsequently used when the new client device 500 connects to the relying party 550.

In one embodiment, after the registration data base been stored in the local secure storage 325, a series of bootstrapping operations may be performed by the trust delegation application 600 to leverage the delegated registrations on the new client device 500 with relying parties (e.g., websites, services, etc) that had previously been registered with the trusted client device 502. Alternatively, the described bootstrapping operations may be performed by the authentication engine 310 itself (via direct communication with the secure transaction service 604 as shown in FIG. 6). The underlying principles of the invention remain the same regardless of which particular software component on the new client device 500 performs the operations.

In particular, in one embodiment, the secure transaction service 604 of the relying party 550 detects that there are registrations on the new client device 500 using the remote authentication protocol supported by the secure transaction service 604 and trust delegation application 600. In one embodiment, the user may initially be asked by the secure transaction service 604 to perform biometric authentication or other form of authentication (e.g., entering a secure code) from the new client device 500. In addition, at this stage, the secure transaction service 604 may verify the timestamp inserted into the signature(s) and ensure that the timestamp is not older than a threshold amount of time.

Assuming that the user successfully provides biometric or other authentication data at an acceptable assurance level, the trust delegation application 600 and/or the new authenticator 310 prepare a response including the following three assertions:

1. An attestation over the new device public key associated with the relying party (ND_Uauth.pub). In one embodiment, the attestation comprises a signature generated over the public key (e.g., using a public key of the relying party).

2. An assertion using the new device private key associated with the relying party (ND_Uauth.priv). In one embodiment, to generate the assertion, the private key is used to generate a signature over content known by the relying party (e.g., such as a random challenge sent from the relying party). Because the relying party is provided with the public key (in step 1), it can decrypt the content, thereby verifying that the private key was used to encrypt the content.

3. The signature previously generated by the trusted client device and associated with the new device public key for this particular relying party (TD_Uauth.sig) along with the key ID used by the relying party (TD_Uauth.keyid) to locate the public key (e.g., so that it may use the key ID to query its secure transaction database 625 to retrieve the public key).

In one embodiment, all of the above data is then transmitted to the secure transaction service 604 of the relying party in a remote authentication response.

In one embodiment, after receiving the above assertions, the secure transaction service 604 may perform the following verifications:

1. Locate the trusted device's public key (TD_Uauth.pub) using the key ID;

2. Verify the signature generated by the trusted device (TD_Uauth.sig) using the trusted device's public key (TD_Uauth.pub);

3. Verify the signature generated by the new device's private key (ND_Uauth.sig) using the new device's public key (ND_Uauth.pub); and 4. Verify the attestation over the new device public key associated with the relying party (ND_Uauth.pub). In one embodiment, this verification is performed using the private key of the relying party.

Figure 7:
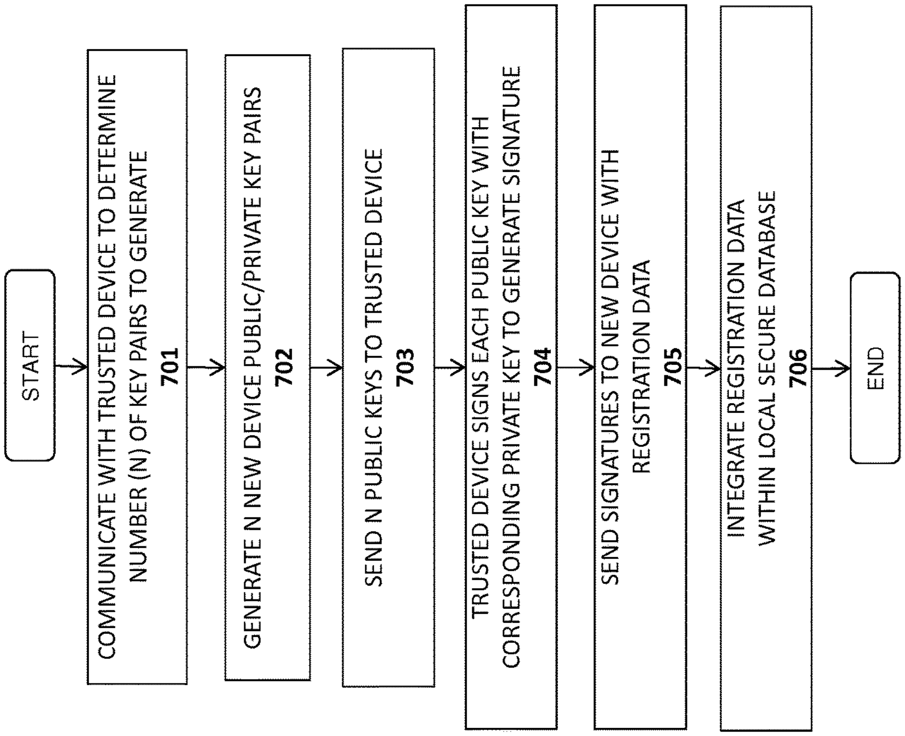
FIG. 7 illustrates one embodiment of a method for delegating trust to a new client device from a trusted client device.
Figure 8:
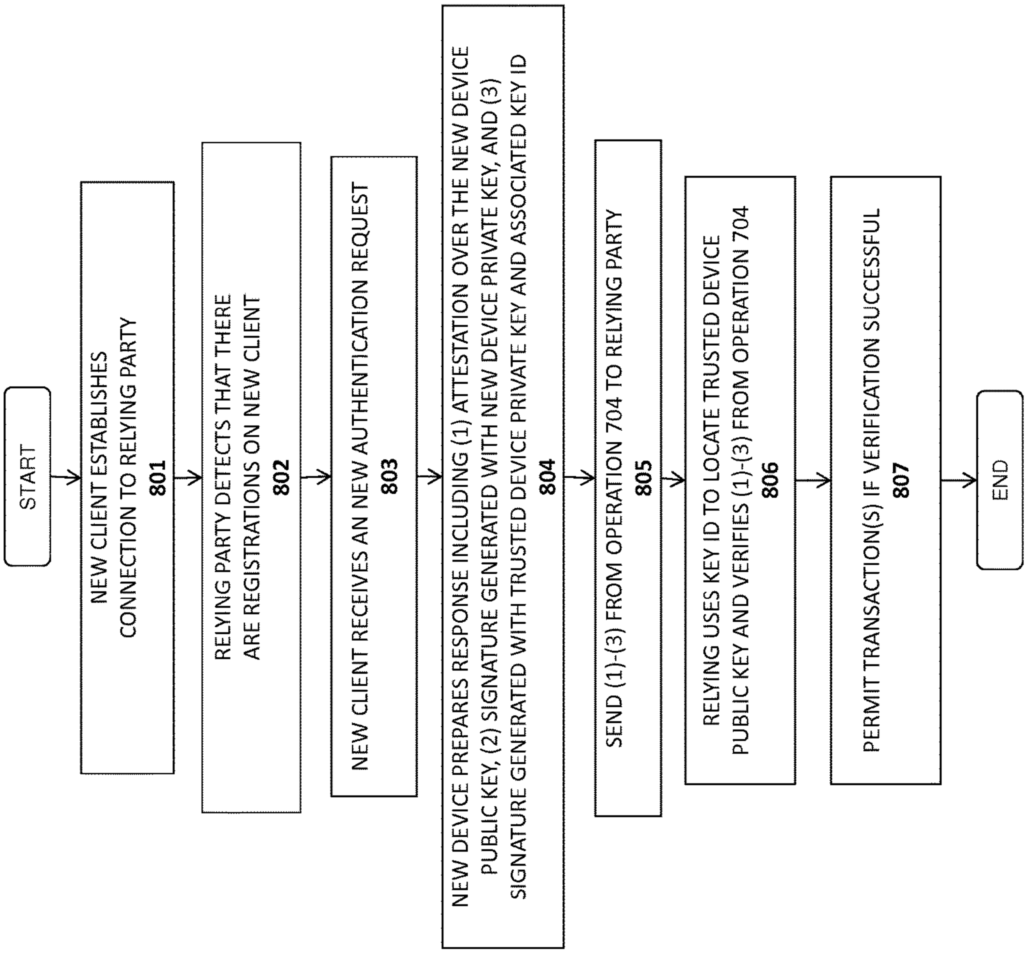
FIG. 8 illustrates one embodiment of a method for verifying a trust delegation provided to a new client device from a trusted client device.

One embodiment of a method for securely transferring registration data from a trusted device to a new device is illustrated in FIG. 7 and one embodiment of a method for verifying the registration data with the relying party is illustrated in FIG. 8. While these methods may be implemented within the context of the system architectures shown in FIGS. 5-6, the underlying principles of the invention are not limited to any particular system architecture.

Turning first to FIG. 7, at 701, the new devices establishes a secure communication channel with the trusted device and determines the number (N) of key pairs to generate. As mentioned, this may be the number of key pairs registered by the trusted device with relying parties.

At 702, the new device generates N new public/private key pairs. In an alternate implementation which utilizes symmetric keys, the new device may generate a single (symmetric) key to be shared with the relying party. At 703, the N public keys are sent to the trusted device and, at 704, the trusted device signs each public key with a corresponding private key to generate a signature. At 705, the signatures are sent to the new device with other registration data for the relying party (e.g., key IDs, application IDs, etc). Finally, at 706, all of the registration data and signatures are integrated within the local secure database(s) used by the authentication engine.

Turning now to FIG. 8, at 801 at new client (having already performed the delegation operations from FIG. 7) establishes a secure connection with the relying party. At 802, the relying party detects that there are existing registrations which have been delegated to the new device. In response, at 803, the relying party makes an authentication request to the new device. The user may then authenticate using one or more biometric or other authentication techniques. As discussed above, at 804, the new device prepares a response which includes an attestation over the new device public key, a signature generated with the new device private key (e.g., over a challenge), and the signature generated with the trusted device's private key and the associated key ID. At 805 all of the data in the response is transmitted to the relying party and, at 806, the relying party verifies the data contained in the response (see above for details of one embodiment). If the verification is successful, then at 807 the transaction being attempted by the user is permitted.

The techniques described herein may be used to delegate trust between two authenticators on different devices (as described above). In addition, in one embodiment, these techniques may be used to delegate trust between two authenticators on the same device. In this case, the secure connection between two devices does not need to be established but all of the other operations may be performed between the two authenticators within the device.

Moreover, it should be noted that some of the operations involved can be implemented in various ways. For example the secure protocol for delegating trust may be initiated by trusted device rather than the new device. In either case, the new device (or, more specifically, the authenticator on the new device) may generate a number of new key pairs (ND_Uauth) and the authenticator on the trusted device may sign the public keys of these key pairs.

System and Method for Privacy-Enhanced Data Synchronization

Current systems exist for synchronizing data between multiple client devices using cloud services. When a user creates a new document on a device (e.g., snaps a picture, creates a word processing document, etc) or modifies an existing document, a cloud service to which the user is subscribed will typically store a copy of the new/modified document "in the cloud." When the user accesses the cloud service from a second device (e.g., a computer at work or a another device used by a different family member), the cloud service may be configured to synchronize the device.

One problem which exists is that data is frequently stored in the cloud service in an unencrypted format thereby making the data vulnerable to various types of cyber attacks and queries by federal agencies.

The embodiments of the invention described below provide a set of protocols and techniques which allow data to be synchronized among devices in a privacy-enhanced manner. Using these protocols and techniques, cloud services never have access to data in plaintext (e.g., unencrypted format), thereby preserving the user's privacy.

As an initial matter, it should be noted that the techniques described below for synchronizing data among devices do not rely on the advanced authentication techniques described herein. For example, these synchronizing techniques may be employed outside of the context of a system for remote user authentication as described for other embodiments of the invention. However, these synchronization techniques may be used to perform synchronization for these remote user authentication embodiments. For example, in one embodiment, the registration data for each Website or other online service visited by the user may be synchronized among multiple devices using these synchronization techniques.

As used herein, a "circle" means a network of devices trusted by a user and "circle-id" means an identifier identifying a circle (e.g., one which cannot be easily guessed). A "circle-cloud" means an online service which is used to store information about circles and trust-chains (defined below) and acts as a communication hub for client devices. In one embodiment, the circle-cloud does not store any confidential data (at least not in an unencrypted format). The term "d.pub" refers to a device's public key, "d.priv" refers to the device's private key and d.pub/d.priv refers to an asymmetric public/private key pair of a device d. In one embodiment, d.priv never leaves device d. The "trust-chain" means the persistent data stored on the circle-cloud containing information about devices trusted by user and their relationships. A "circle-channel" means a secure communication channel provided by the circle-cloud that is used by two (or more) devices to exchange and synchronize data between them.

Figure 9:
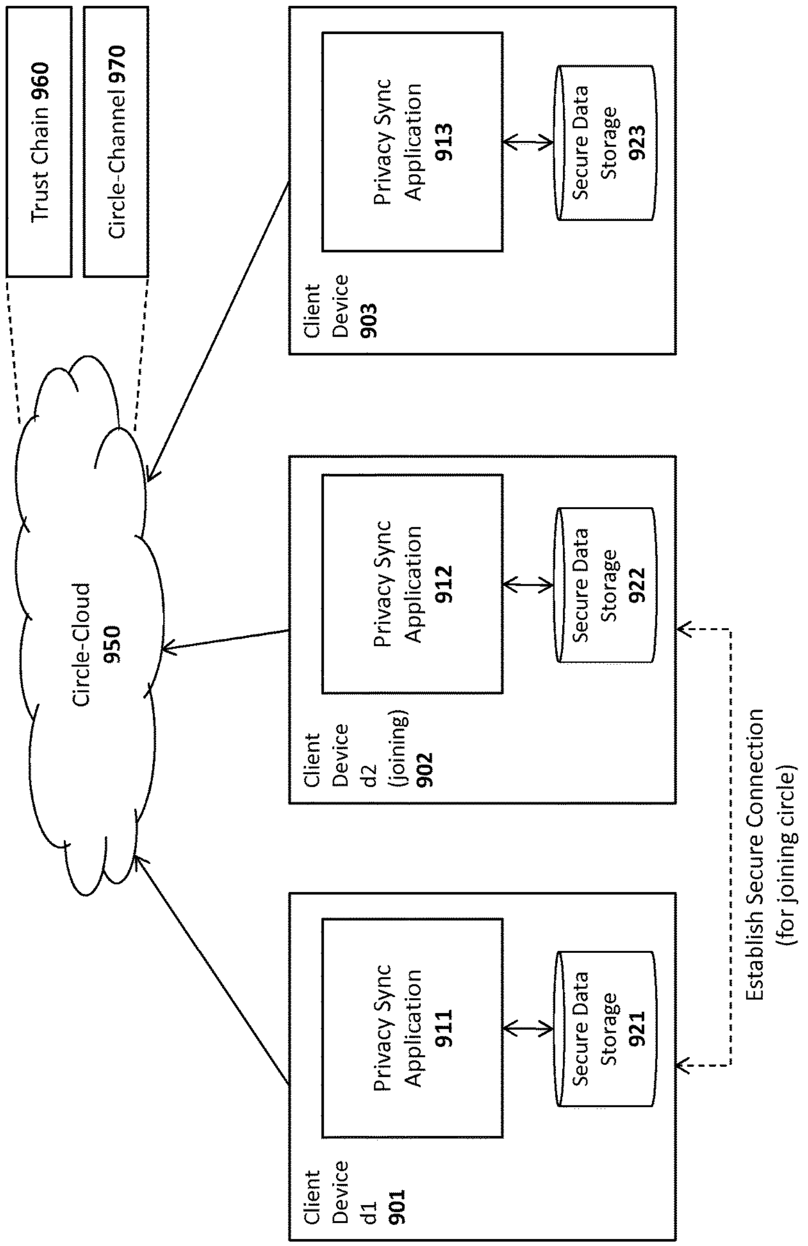
FIG. 9 illustrates one embodiment of a system for synchronizing private data between devices.

One embodiment of the invention comprises a protocol and associated techniques for allowing a new user device to (a) join a circle and (b) subsequently synchronize with the circle. These embodiments will be described with respect to FIG. 9 which shows a three client devices 901-903 each with a privacy sync application 911-913, respectively, for implementing the protocols and techniques described herein and secure data storage 921-932, respectively, for storing data used for joining and synchronizing. Device 901 is sometimes referred to herein as device d1, device 902 is sometimes referred to as device d2, and device 903 is sometimes referred to as device d3.

In one embodiment the joining and synchronizing are performed through a circle cloud 950 which includes a plurality of storage servers. A trust chain 960 within the circle cloud 950 maintains data defining trust relationships between the devices 901-903 as described below. The circle channel 970 comprises a secure communication channel provided by the circle-cloud that is used by two or more devices to exchange and synchronize data.

a. Joining the Circle

A device 902 (d2) joins an existing network of devices 901 (d1) and 903 (d3) that belong to the user (i.e., the "circle" of trusted devices). A device 902 can join an existing circle only if another device 901, which is already part of that circle, authorizes it.

Figure 10:
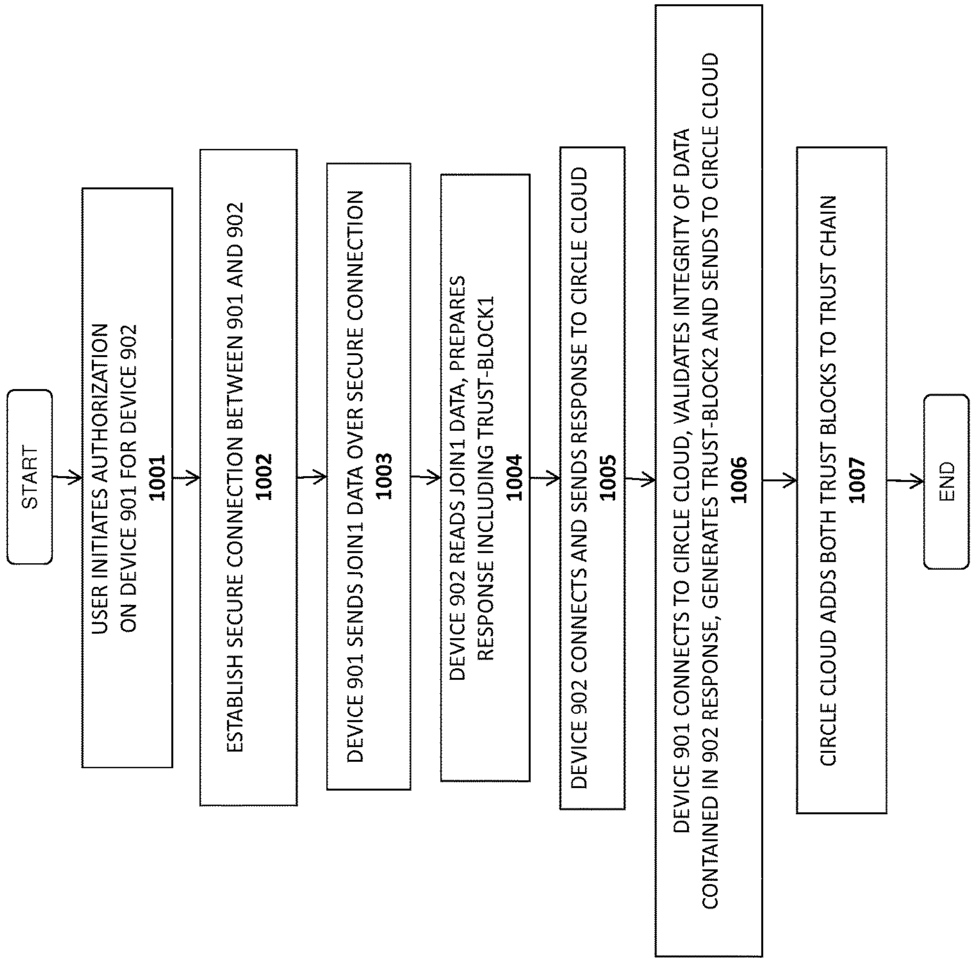
FIG. 10 illustrates one embodiment of a method for adding a device to a trust circle.

One embodiment of a method for authorizing a new device 902 using a trusted device 901 is illustrated in FIG. 10. At 1001 a user authorizes the new device 902 on an existing trusted device 901. For example, in one embodiment, the user may initiate its privacy sync application 911 on the trusted device 901 and the privacy sync application 912 on the new client device 902.

At 1002, in one embodiment, the privacy sync applications 911-912 cause the devices 901-902 to establish a secure connection. Various techniques may be used to establish the secure connection such as near field communication (NFC), Bluetooth, Wifi Direct, using a quick response (QR) code and establishing an HTTPS connection.

At 1003, device 901 sends secure data to the new device 902, referred to herein as "join1_data." In one embodiment, the join1_data includes the following fields: {d1.pub, sk.sym, circle-id}, where d1.pub is the public key of device 901, sk.sym is a randomly-generated session key generated by device 901, and the circle-id is a unique identification code identifying the circle which device 902 is joining.

At 1004, device 902 reads the join1_data and prepares a response which may include the following:

HMAC (sk.sym, d2.pub|T)|d2.pub|T where T is a timestamp trust-block1=S(d2.priv, d1.pub)|d1.pub|d2.pub Note that HMAC stands for Hash-Based Message Authentication Code. In the above embodiment, the HMAC is generated by concatenating the public key of device 902 with a timestamp and protecting the integrity of the result with sk.sym using HMAC or a similar algorithm. In addition, trust-block1 includes a signature generated with device 902's private key over device 901's public key. In one embodiment, the trust-block1 entry also includes a timestamp (T).

Returning to FIG. 10, At 1005 device 902 securely connects to the circle-cloud 950 and transmits the response which includes the HMAC and trust-block1. The circle-cloud 950 stores the data received by device 901 and waits for device 901 to connect.

At 1006, device 901 connects to the circle cloud using the circle-id, validates the integrity of the data contained in device 902's response from operation 1005, and generates trust-block2. In particular, in one embodiment, device 901 reads and validates the integrity of d2.pub and T using sk.sym (e.g., using sk.sym to decrypt d2.pub and T). Device 901 then signs d2.pub using its own private key, d1.priv and generates trust-block2=S(d1.priv, d2.pub)|d2.pub|d1.pub, which comprises a signature generated over d2.pub with d1 priv. In one embodiment, trust-block2 also includes a timestamp (T). The device 901 then sends the above data including trust-block2 to the circle cloud 950.

At 1007, the circle-cloud 950 adds both trust-blocks to trust-chain 960. In one embodiment, after the above operations, device 902 joins the circle associated with circle-id. All devices 901, 903 in this circle trust device 902 and device 902 trusts all of these devices. Note that any trusted device can authorize a new device using the techniques described herein.

b. Sync with Circle

During this process the devices 901-903, belonging to the same circle, sync data between them. There can be different application-specific sub-protocols implemented on top of this process. For example, an online cloud storage application may want to keep user's data synchronized on all devices and keep the encrypted copy on circle-cloud. Another application may propagate messages to the devices in the circle. For example, in one embodiment, registration data used by one device to authenticate with a remote relying party may be synchronized across all devices in the circle. Various other applications and sub-protocols may be implemented while still complying with the underlying principles of the invention. All such sub-protocols may use the foundational process blocks described below.

Trust-Chain

As demonstrated in the "Join the Circle" process (FIG. 10), what goes into trust-chain 960 a proof which asserts that device2 is trusted by device1. Thus, a trust-chain 960 is a chain of authorization blocks each of which asserts a trust relationship between two devices. In one embodiment, a trust-chain is commutative, meaning that if device 901 trusts device 902 then device 902 trusts device 901. The trust-chain 960 is considered to be broken if there is a block asserting that device 901 trusts device 902 and there is no block asserting that device 902 trusts device 901. In one embodiment, the trust-chain 960 is also transitive, meaning that if device 901 trusts device 902 and device 902 trusts device 903 then device 901 trusts device 903. In one embodiment, the trust-chain is circle-id specific and it does not contain any confidential information about devices.

In one embodiment, the trust chain 960 comprises a plurality of trust blocks and each block includes the following data: {di.pub, dj.pub, S(di.priv, dj.pub), S(dj.priv, di.pub)}—i.e., the public keys of each device and a signature generated using the private key of each device over the public key of each other device.

The above assertion means that device di trusts device dj and vice versa. In one embodiment, the trust-chain 960 is used by devices 901-902 to determine and verify which devices are in the circle. After the devices verify that they are in the same circle, they may use the circle-channel 970 to synchronize encrypted data between them.

In one embodiment, to determine whether device di is in the same circle as device dj the following operations are performed: (a) construct a directional graph where each node is a device in trust-chain and each arrow corresponds to a block in trust-chain and (b) determine if there is a direct path connecting di and dj.

Circle-Channel

Figure 11:
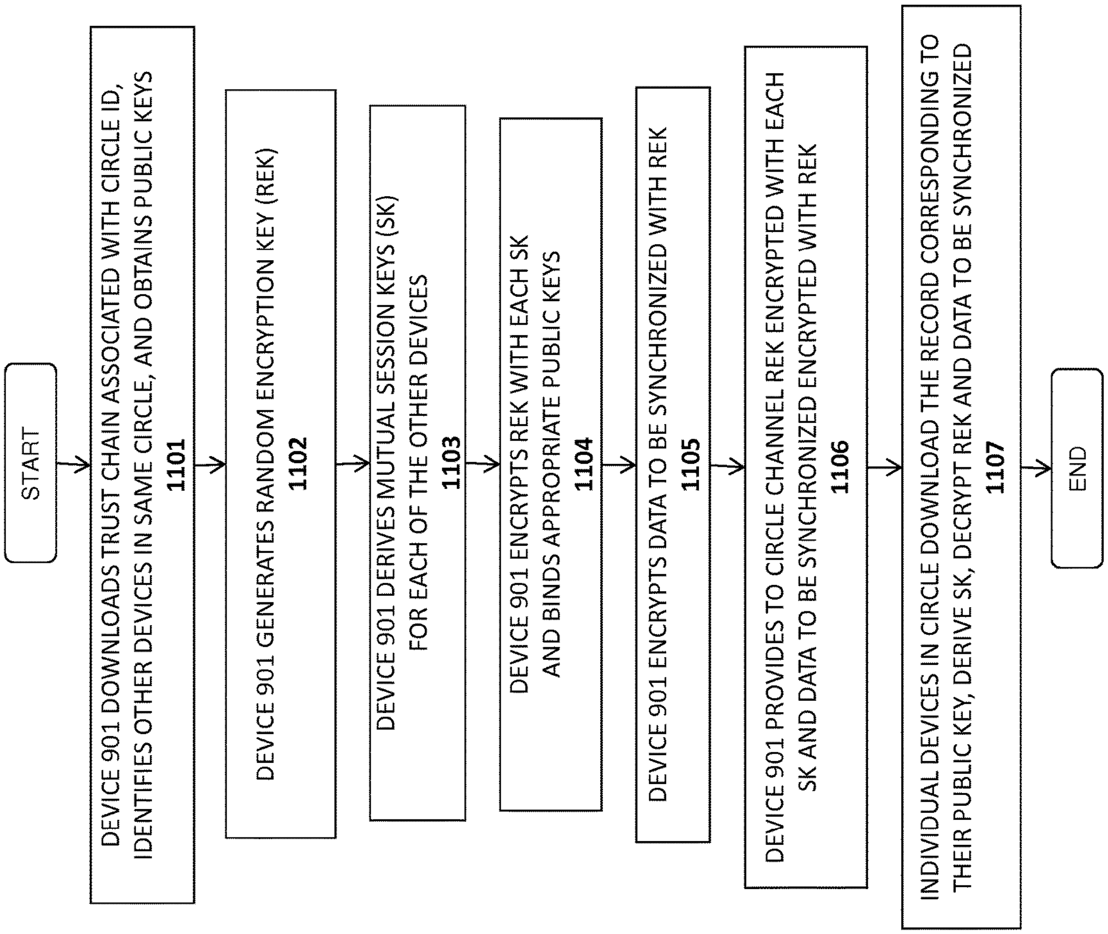
FIG. 11 illustrates one embodiment of a method for synchronizing data between devices.

In one embodiment, the process illustrated in FIG. 11 is implemented to synchronize data between other devices in the same circle. In the illustrated example, device 901 (d1) is the device that has new data and wants to send to other devices. At 1101, device 901 downloads the trust-chain 960 associated with the circle-id, identifies the other devices in the same circle from the trust-chain (e.g., devices 902-903), and obtains the public keys of the other devices in the same circle using the trust-chain.

At 1102, the device 901 generates a random encryption key (REK) (e.g., using known techniques for random number generation). At 1103, device 901 derives mutual session keys (SK) for each of the other devices in the circle. In one embodiment, device 901 derives the SKs using the Diffie-Hellman key exchange algorithm with respect to each of the other others devices. Diffie-Hellman is a well known algorithm which allows two parties that have no prior knowledge of each other to jointly establish a shared secret key. In the instant case, for example, if a first device has a key pair and provides its public key to a second device, then the second device can automatically derive a new key (SK in the instant application) independently using its private key and the first device's public key (and vice versa). In one embodiment, device 901 uses these techniques to generate a different SK for each other device 902, 903.

At 1104, the device 901 encrypts REK with each derived SK for each device and binds the appropriate public keys with them. For example, for a device d1 which generates SKi and SKj for devices di and dj, respectively, it uses the session keys to encrypt REK as follows:

{d1.pub, di.pub, E(SKi, REK)} (for device di)

{d1.pub, dj.pub, E(SKj, REK)} (for device dj)

In at the end of the process, each of the devices di and dj are able to decrypt REK using their respective session keys (which have been independently derived by each device using Diffie-Hellman as discussed above).

At 1105, device 901 encrypts the data to be synchronized with REK—i.e., E(REK, data-to-be-synced). As mentioned, any data may be synchronized in this manner such as multimedia files, productivity document, and/or client configuration data (e.g., relying party registration data as discussed above), to name a few.

At 1107, device 901 provides to the circle channel the REK encrypted with each SK and the data to be synchronized, encrypted with REK:

[{d1.pub, di.pub, E(SKi, REK)}, {d1.pub, dj.pub, E(SKj, REK)}, . . . ] E(REK, data-to-be-synced)

After the data has been provided to the circle-channel, at 1106 individual devices in the same circle download the record corresponding to their public key (e.g., {d1.pub, di.pub, E(SKi, REK)} for device di), derive the same SK (e.g., SKi), decrypt REK and use REK to decrypt the data to be synchronized.

In one embodiment, a "join circle" operation as described above may require user authentication on both device1 and device2. When this protocol is implemented using the remote authentication techniques described herein, a user may be required to, for example, "swipe" a finger to authenticate on both devices to initiate and complete the "join circle" process. By contrast, in one embodiment, syncing data between devices as described may not require user authentication.

The protocol and associated techniques described herein allow networks of devices to be built that trust each other. Significantly, all data transmitted to and from the cloud and stored within the cloud is encrypted. Consequently, data may be synchronized among the plurality of devices without storing any confidential data on cloud, resulting in improved user privacy protection.

The embodiments of the invention described above implement a private synchronization protocol for device synchronization where the participating cloud storage cannot view any of the user's data in plaintext (i.e., data is encrypted in the cloud). These embodiments includes various novel and beneficial features including, but not limited to:

- A system and method implementing a device synchronization protocol where device has a public and private key for authorizing other devices.
- A system and method which implement a trust-chain to indicate trust relationships between devices within the same circle.
- A system and method where devices use Diffie-Hellman or similar key exchange algorithms to generate mutual session keys and encrypt data with those keys.
- A system and method where a hash of a circle-id is stored in a circle-cloud instead of on the device itself.
- A system and method where circle-cloud uses a challenge response protocol to authenticate a device before allowing it to put any data in circle's circle-channel.
- A system and method where a permanent circle group key is used to encrypt the syncing data
- An application which uses the described private synchronization protocols to share user's data (documents, files, photos, etc) among multiple devices and stores the encrypted backup of data on the cloud.
- A system and method where the device's private key (d.priv) and all operations that use this key are implemented inside an authenticator for remotely authenticating a user over a network.

An application which uses the described private synchronization protocols in combination with the embodiments of the invention for performing user controlled trust delegation to a new device to share authenticator registrations among a user's devices.

An application which uses the described private synchronization protocols in combination with the embodiments of the invention for performing user controlled trust delegation to a new device to share new registrations among a user's devices where a user doesn't need to authenticate with an authenticator every time when a new registration is being delegated to other devices.

A set of authenticators belonging to the same user and forming a circle, where these authenticators are using the private synchronization protocols described above to sync authentication key pairs in order to share registrations of a single authenticator with other authenticators belonging to the same circle.

Exemplary System Architectures

It should be noted that the term "relying party" is used herein to refer, not merely to the entity with which a user transaction is attempted (e.g., a Website or online service performing user transactions), but also to the secure transaction servers implemented on behalf of that entity which may performed the underlying authentication techniques described herein. The secure transaction servers may be owned and/or under the control of the relying party or may be under the control of a third party offering secure transaction services to the relying party as part of a business arrangement. These distinctions are indicated in FIGS. 12A-B discussed below which show that the "relying party" may include Websites 1231 and other network services 1251 as well as the secure transaction servers 1232-1233 for performing the authentication techniques on behalf of the websites and network services.

Figure 12A:
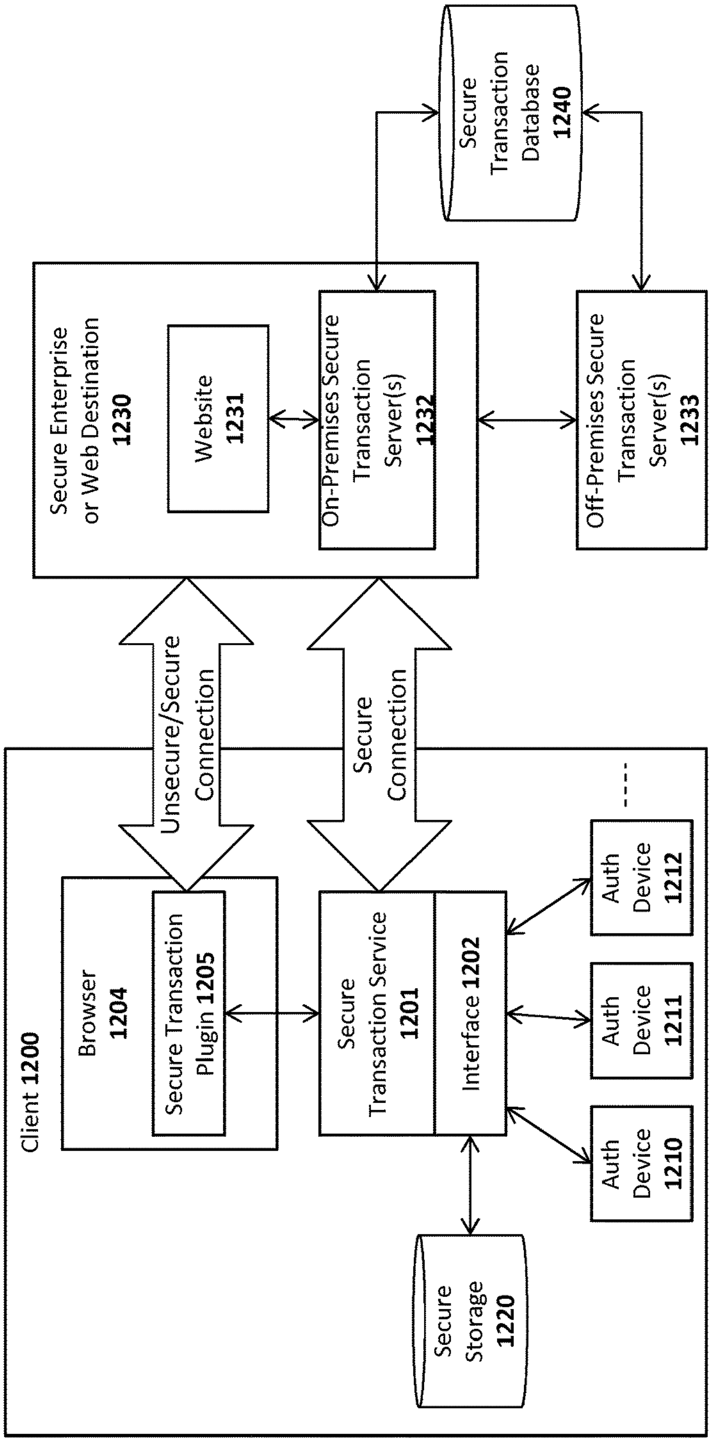
FIGS. 12 A-B illustrate exemplary system architectures on which the embodiments of the invention may be implemented.
Figure 12B:
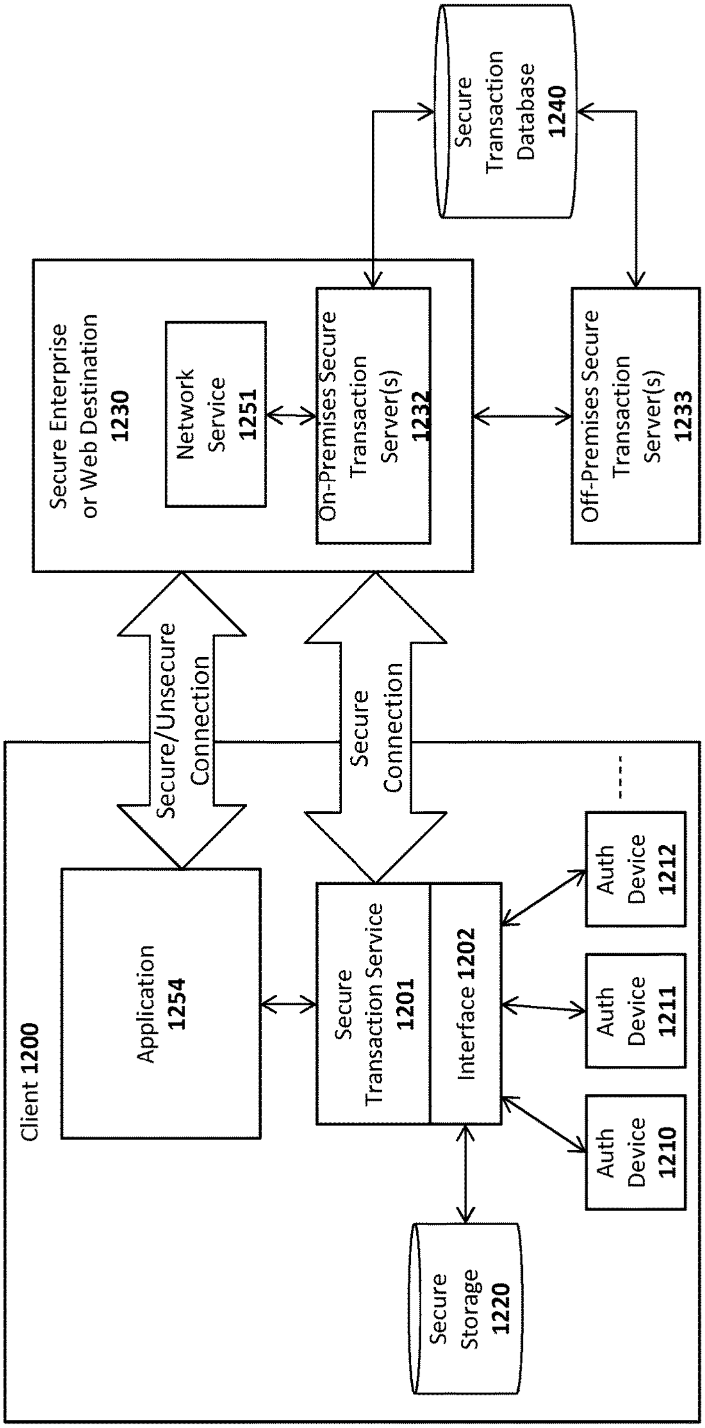

In particular, FIGS. 12A-B illustrate two embodiments of a system architecture comprising client-side and server-side components for authenticating a user. The embodiment shown in FIG. 12A uses a browser plugin-based architecture for communicating with a website while the embodiment shown in FIG. 12B does not require a browser. The various user confirmation and trust delegation techniques described herein may be employed on either of these system architectures. For example, the authentication engine 310, secure transaction application 304, and/or trust delegation application 600 may be implemented as part of the secure transaction service 1201 including interface 1202. It should be noted, however, that the embodiments described with respect to FIGS. 1-8 may be implemented using logical arrangements of hardware and software other than those shown in FIGS. 12A-B.

Turning to FIG. 12A, the illustrated embodiment includes a client 1200 equipped with one or more authentication devices 1210-1212 for enrolling and authenticating an end user. As mentioned above, the authentication devices 1210-1212 may include biometric devices such as fingerprint sensors, voice recognition hardware/software (e.g., a microphone and associated software for recognizing a user's voice), facial recognition hardware/software (e.g., a camera and associated software for recognizing a user's face), and optical recognition capabilities (e.g., an optical scanner and associated software for scanning the retina of a user) and non-biometric devices such as a trusted platform modules (TPMs) and smartcards. A user may enroll the biometric devices by providing biometric data (e.g., swiping a finger on the fingerprint device) which the secure transaction service 1201 may store as biometric template data in secure storage 1220 (via interface 1202).

While the secure storage 1220 is illustrated outside of the secure perimeter of the authentication device(s) 1210-1212, in one embodiment, each authentication device 1210-1212 may have its own integrated secure storage. Additionally, each authentication device 1210-1212 may cryptographically protect the biometric reference data records (e.g., wrapping them using a symmetric key to make the storage 1220 secure).

The authentication devices 1210-1212 are communicatively coupled to the client through an interface 1202 (e.g., an application programming interface or API) exposed by a secure transaction service 1201. The secure transaction service 1201 is a secure application for communicating with one or more secure transaction servers 1232 over a network and for interfacing with a secure transaction plugin 1205 executed within the context of a web browser 1204. As illustrated, the Interface 1202 may also provide secure access to a secure storage device 1220 on the client 1200 which stores information related to each of the authentication devices 1210-1212 such as a device identification code, user identification code, user enrollment data (e.g., scanned fingerprint or other biometric data), and keys used to perform the secure authentication techniques described herein. For example, as discussed in detail below, a unique key may be stored into each of the authentication devices and used when communicating to servers 1230 over a network such as the Internet.

In addition to enrollment of devices, the secure transaction service 1201 may then register the biometric devices with the secure transaction servers 1232-1233 over the network and subsequently authenticate with those servers using data exchanged during the registration process (e.g., encryption keys provisioned into the biometric devices). The authentication process may include any of the authentication techniques described herein (e.g., generating an assurance level on the client 1200 based on explicit or non-intrusive authentication techniques and transmitting the results to the secure transaction servers 1232-1233).

As discussed below, certain types of network transactions are supported by the secure transaction plugin 1205 such as HTTP or HTTPS transactions with websites 1231 or other servers. In one embodiment, the secure transaction plugin is initiated in response to specific HTML tags inserted into the HTML code of a web page by the web server 1231 within the secure enterprise or Web destination 1230 (sometimes simply referred to below as "server 1230"). In response to detecting such a tag, the secure transaction plugin 1205 may forward transactions to the secure transaction service 1201 for processing. In addition, for certain types of transactions (e.g., such as secure key exchange) the secure transaction service 1201 may open a direct communication channel with the on-premises transaction server 1232 (i.e., co-located with the website) or with an off-premises transaction server 1233.

The secure transaction servers 1232-1233 are coupled to a secure transaction database 1240 for storing user data, authentication device data, keys and other secure information needed to support the secure authentication transactions described below. It should be noted, however, that the underlying principles of the invention do not require the separation of logical components within the secure enterprise or web destination 1230 shown in FIG. 12A. For example, the website 1231 and the secure transaction servers 1232-1233 may be implemented within a single physical server or separate physical servers. Moreover, the website 1231 and transaction servers 1232-1233 may be implemented within an integrated software module executed on one or more servers for performing the functions described below.

As mentioned above, the underlying principles of the invention are not limited to a browser-based architecture shown in FIG. 12A. FIG. 12B illustrates an alternate implementation in which a stand-alone application 1254 utilizes the functionality provided by the secure transaction service 1201 to authenticate a user over a network. In one embodiment, the application 1254 is designed to establish communication sessions with one or more network services 1251 which rely on the secure transaction servers 1232-1233 for performing the user/client authentication techniques described in detail below.

In either of the embodiments shown in FIGS. 12A-B, the secure transaction servers 1232-1233 may generate the keys which are then securely transmitted to the secure transaction service 1201 and stored into the authentication devices within the secure storage 1220. Additionally, the secure transaction servers 1232-1233 manage the secure transaction database 1240 on the server side.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable program code. The machine-readable medium may include, but is not limited to, floppy diskettes, optical disks, CD-ROMs, and magneto-optical disks, ROMs, RAMs, EPROMs, EEPROMs, magnetic or optical cards, or other type of media/machine-readable medium suitable for storing electronic program code.

Throughout the foregoing description, for the purposes of explanation, numerous specific details were set forth in order to provide a thorough understanding of the invention. It will be apparent, however, to one skilled in the art that the invention may be practiced without some of these specific details. For example, it will be readily apparent to those of skill in the art that the functional modules and methods described herein may be implemented as software, hardware or any combination thereof. Moreover, although some embodiments of the invention are described herein within the context of a mobile computing environment, the underlying principles of the invention are not limited to a mobile computing implementation. Virtually any type of client or peer data processing devices may be used in some embodiments including, for example, desktop or workstation computers. Accordingly, the scope and spirit of the invention should be judged in terms of the claims which follow.

I claim:

1. A method for enabling one or more new authenticators being implemented in hardware of a new client device, the method comprising:

the one or more new authenticators determining a number (N) of keys or key pairs contained in registration data associated with a trusted authenticator on a trusted client device, wherein the number N is equal to a number of keys or key pairs that have been registered with a relying party for the trusted authenticator and that also are on the trusted client device, wherein the relying party is remote from the trusted client device and the new client device, wherein the trusted client device and the new client device are mobile devices, and wherein the determination further comprises:

the one or more new authenticators communicating with the trusted authenticator to obtain the number of keys or key pairs in the registration data;

the one or more new authenticators generating N new keys or key pairs of the one or more new authenticators;

the one or more new authenticators providing the N new keys or one of each of the N new key pairs to the trusted authenticator, wherein the trusted authenticator signs each of the N new keys using a key, which corresponds to registration of the trusted authenticator with the relying party, and wherein the trusted authenticator inserts a timestamp into each signature during the signing; and the one or more new authenticators receiving N signatures from the trusted authenticator, wherein the N signatures are based on the N new keys or the one of each of the N new key pairs; and the one or more new authenticators performing one or more verification transactions with the relying party based on the N signatures and using the timestamps.

2. The method as in claim 1 further comprising:

the trusted authenticator transferring each of the signatures and registration data associated with the relying party to the one or more new authenticators.

3. The method as in claim 2 further comprising:

the one or more new authenticators integrating the registration data and signatures within a local secure database.

4. The method as in claim 3, wherein the performing the one or more verification transactions with the relying party comprises:

the one or more new authenticators establishing a connection with the relying party;

the one or more new authenticators identifying the registration data, one of the N new keys, and the corresponding signature in the local secure database; and the one or more new authenticators performing one or more verification transactions with the relying party using the registration data, the one of the N new keys, and the corresponding signature.

5. The method as in claim 4 wherein at least one of the verification transactions comprises reading the timestamps and determining whether the timestamp is sufficiently new to allow the one or more new authenticators to be enabled.

6. The method as in claim 5 wherein the verification transactions include the one or more new authenticators transmitting a response to the relying party comprising an attestation over the one of the N new keys, the corresponding signature, and a new signature generated with the one of the N new keys.

7. The method as in claim 6 wherein the attestation over the one of the N new keys comprises a signature generated over the one of the N new keys.

8. The method as in claim 6 wherein the new signature is generated over a challenge sent by the relying party.

9. The method as in claim 6 wherein the response further includes an identification code usable by the relying party to identify and locate a trusted key associated with the trusted client device.

10. The method as in claim 9 further comprising:

verifying the signature at the relying party using the trusted key.

11. The method as in claim 10 wherein the trusted key comprises a public key associated with the trusted client device or the trusted authenticator.

12. A system comprising:

a trusted authenticator implemented in hardware of a first device;

one or more new authenticators that is implemented in hardware of a second device; and a relying party remote from the first and second devices;

wherein the one or more new authenticators to be enabled, wherein the enabling operations comprises:

the one or more new authenticators determining a number (N) of keys or key pairs contained in registration data associated with the trusted authenticator on a trusted client device, wherein the number N is equal to a number of keys or key pairs that have been registered with the relying party for the trusted authenticator and that also are on the trusted client device, wherein the trusted client device and the new client device are mobile devices, and wherein the determination further comprises:

the one or more new authenticators communicating with the trusted authenticator to obtain the number of keys or key pairs in the registration data;

the one or more new authenticators generating N new keys or key pairs of the one or more new authenticators;

the one or more new authenticators providing the N new keys or one of each of the N new key pairs to the trusted authenticator, wherein the trusted authenticator signs each of the N new keys using a key, which corresponds to registration of the trusted authenticator with the relying party, and wherein the trusted authenticator inserts a timestamp into each signature during from the signing;

the one or more new authenticators receiving N signatures from the trusted authenticator, wherein the N signatures are based on the N new keys or the one of each of the new N key pairs; and the one or more new authenticators performing one or more verification transactions with the relying party based on the N signatures and using the timestamps.

13. The system as in claim 12 wherein the enabling further comprises:

the one or more new authenticators integrating the registration data and signatures within a local secure database.

14. The system as in claim 13 wherein the performing the one or more verification transactions with the relying party comprises:

the one or more new authenticators establishing a connection with the relying party;

the one or more new authenticators identifying the registration data, one of the N new keys, and the corresponding signature in the local secure database; and the one or more new authenticators performing one or more verification transactions with the relying party using the registration data, the one of the N new keys, and the corresponding signature.

15. The system as in claim 14 wherein the verification transactions include transmitting a response to the relying party comprising an attestation over the one of the N new keys, the corresponding signature, and a new signature generated with the one of the N new keys.

16. The system as in claim 15 wherein the attestation over the one of the N new keys comprises a signature generated over the one of the N new keys.

17. The system as in claim 15 wherein the new signature is generated over a challenge sent by the relying party.

18. The system as in claim 15 wherein the response further includes an identification code usable by the relying party to identify and locate a trusted key associated with the trusted client device.

19. The system as in claim 18 further comprising:

verification logic to verify the signature at the relying party using the trusted key.

20. The system as in claim 19 wherein the trusted key comprises a public key associated with the trusted client device or the trusted authenticator.

* * * * *